United States Patent
Yashiro

(10) Patent No.: US 8,422,905 B2
(45) Date of Patent: Apr. 16, 2013

(54) POWER SOURCE UNIT AND IMAGE FORMING APPARATUS

(75) Inventor: Akira Yashiro, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 283 days.

(21) Appl. No.: 12/853,609

(22) Filed: Aug. 10, 2010

(65) Prior Publication Data

US 2011/0064445 A1 Mar. 17, 2011

(30) Foreign Application Priority Data

Sep. 11, 2009 (JP) .............................. 2009-210373

(51) Int. Cl.
*G03G 15/00* (2006.01)

(52) U.S. Cl.
USPC ......................................................... 399/88

(58) Field of Classification Search ............ 399/37, 399/70, 75, 85, 88, 89, 38, 67–69; 307/52, 307/53; 713/300
See application file for complete search history.

(56) References Cited

U.S. PATENT DOCUMENTS

| 7,675,196 | B2 * | 3/2010 | Kimura | ............................. | 307/52 |
| 7,761,017 | B2 | 7/2010 | Yashiro | | |
| 7,840,153 | B2 * | 11/2010 | Semma et al. | ................... | 399/88 |
| 7,882,371 | B2 * | 2/2011 | Yano | ............................. | 713/300 |

FOREIGN PATENT DOCUMENTS

| JP | 2000-184716 | 6/2000 |
| JP | 2004-74558 | 3/2004 |
| JP | 2005-27374 | 1/2005 |
| JP | 2006-209142 | 8/2006 |
| JP | 2007-127843 | 5/2007 |
| JP | 4308562 | 5/2009 |

* cited by examiner

Primary Examiner — Hoan Tran
(74) Attorney, Agent, or Firm — Oblon, Spivak, McClelland, Maier & Neustadt, L.L.P.

(57) ABSTRACT

A power source unit includes an AC/DC converter to convert alternating current to direct current output, an auxiliary power source storing electric power, a load detector to detect a high/low level of direct current output to a DC-using load device from the AC/DC converter, and a power supply controller. When load to be required exceeds alternating current power source limits, the power supply controller shuts down output of direct current from the AC/DC converter, and instead uses the auxiliary power source to supply power to the DC-using load device. When the load to be required is within alternating current power source limits, the power supply controller uses the AC/DC converter to supply power to the DC-using load device while the load detector detects high voltage for the DC-using load device, and the power supply controller uses the auxiliary power source to supply power to the DC-using load device and shuts down the AC/DC converter while the load detector detects low voltage for the DC-using load device.

16 Claims, 19 Drawing Sheets

POWER SOURCE UNIT AND IMAGE FORMING APPARATUS

CROSS-REFERENCE TO RELATED APPLICATIONS

This application claims priority to Japanese Patent Application No. 2009-210373, filed on Sep. 11, 2009 in the Japan Patent Office, which is hereby incorporated by reference herein in its entirety.

BACKGROUND OF THE INVENTION

1. Field of the Invention

The present invention relates to a power source unit including a main power source, mainly employing an AC/DC converter, and an auxiliary power source which can store energy. The present invention can be employed for apparatuses such as image forming apparatuses including copiers, printers, facsimile machines or the like, which devices may exhibit greater fluctuation in power consumption, with low power consumption mode set during a waiting condition, a high power consumption mode is set when the device is activated for printing, and a medium power consumption mode is set when activation is completed and operation can commence.

2. Description of the Background Art

Recently, environmental concerns have become important matters, in which energy saving is one of important issue. To implement energy saving, many functions of electronic devices are set in a deactivated condition during a standby mode when the devices are not in use except for a receiving function which is used for waiting for operational instructions signals. Such a condition, in which many functional units are deactivated, may be referred to in general as an energy saving mode or a sleep mode. For example, when a printer enters the energy save mode, power supply to a fusing unit, a drive motor, or the like is stopped, whereas power is supplied only to an electronic circuit and functional elements used to receive signals, including printing instructions.

Power consumption of electronic circuits in the waiting condition (or load power during the energy saving mode) is very small compared to power consumption of functional units used for printing operation, such as a fusing unit, a motor driver, or the like. Power consumption during the energy save mode has some international official standards such as Energy Star, which sets a standard measurement method for power consumption. Because such standard can be used to compare power consumption of different devices of different manufacturers, users can use such standard as one of decision making tools when selecting devices.

Further, for example, image forming apparatuses using an electrophotographic process, such as copiers, printers, facsimile machines, and multi-functional peripherals combining various functions, have become more sophisticated and can now perform many functions. As a result, the structures of these image forming apparatuses has become more complex, thereby increasing maximum power consumption of the image forming apparatuses. Further, there is a trend to increase power supply to a fusing heater to reduce a waiting time of an operator caused by of the image forming apparatus itself, such as a waiting time for starting up the fusing unit and suspension of operation during printing or copying due to a decrease of fusing temperature. Because conventional power source lines (e.g., commercial alternating current power source) have a given upper limit for supplyable power, an auxiliary power source may be used with a main power source to cope with such power supply increase. Thus, for example, when a power amount required to be supplied by the main power source is smaller than a predetermined value, an auxiliary power source is charged and power is stored in the auxiliary power source. Conversely, when power greater than the predetermined value of the commercial alternating current power source is required to be supplied, the power stored in the auxiliary power source is supplied, by which a power supply that can change rapidly within a relatively short time can be effectively supplied.

A main power source used for supplying power to a direct current (DC)-using load device may be an AC/DC converter having a switching power source. Because the switching power source is designed in a way that AC/DC conversion efficiency becomes maximum under a normal rating load condition, the AC/DC conversion efficiency decreases under a low (or light) load condition such as at a waiting condition. Thus, for example, with some typical switching power sources, AC/DC conversion efficiency is 80% under a normal rating load condition, but only 20% under a low (or light) load condition such as at a waiting condition. Accordingly, to achieve energy saving, an improvement of AC/DC conversion efficiency under the low (or light) load condition becomes an important technical consideration.

In JP-2000-184716-A (reference 1), to reduce power consumption of an infrared light receiving circuit of home electric appliance such as television set, which receive operation signal(s) from a remote controller during the waiting condition, a charge storing unit may be disposed in addition to an AC/DC converter, and if voltage decreases, a power source unit drives the AC/DC converter to charge the charge storing unit.

In a power source unit of JP-2004-74558-A (reference 2), an auxiliary power source is charged by a main power source when the main power source outputs power with a high efficiency output such as when a greater power is output, and when the main power source outputs a smaller power with a low efficiency output to supply power under a low (or light) load condition (or energy save mode), the main power source is set to OFF, and the auxiliary power source supplies power to a load device.

In an image forming apparatus of JP-2005-27374-A (reference 3), a direct current main power source such as AC/DC converter charges a storing unit, and the storing unit supplies micro power to a memory backup function, a signal reception/detection function, or the like. When power stored in the storing unit becomes smaller, a switching unit is used to switch condition of the storing unit from discharging to charging.

In JP-2004-266984-A (reference 4), a AC/DC converter (direct current power source unit) used as a switching power source, and an auxiliary power source chargeable by a circuit different from the power source unit (i.e., AC/DC converter) are included, and power source unit switches power supply to an energy saving load device.

In a power source unit of JP-2007-127843-A (reference 5), a fusing heater needs a higher power consumption, and an AC/DC converter, which supplies power to other DC-using load devices, may also need a higher power consumption. When combined power supply for the fusing heater and AC/DC converter exceeds an upper limit of commercial alternating current power, the AC/DC converter is set to OFF to reduce commercial alternating current load, and an auxiliary power source supplies power to DC-using load devices.

However, the auxiliary power sources for the power source units disclosed in the references 1 to 4 supply power only to an energy saving load device, which consumes a little power. Accordingly, a load power cannot be increased more than an upper limit of commercial alternating current used as an initial power source. The power source unit of reference 5 (JP-2007-127843-A), can increase load power more than an upper limit of commercial alternating current, but a power output efficiency under a low (or light) load condition such as a waiting condition becomes low.

SUMMARY

In one aspect of the invention, a power source unit is devised. The power source unit includes an AC/DC (alternating current/direct current) converter to convert alternating current to direct current output, an auxiliary power source capable of storing electric power, a load detector to detect a high/low level of direct current output to a DC-using load device from the AC/DC converter, and a power supply controller to control power supply according to a required load. When load to be required exceeds alternating current power source limits, the power supply controller shuts down output of direct current from the AC/DC converter, and instead uses the auxiliary power source to supply power to the DC-using load device. When the load to be required is within alternating current power source limits, the power supply controller uses the AC/DC converter to supply power to the DC-using load device while the load detector detects high voltage for the DC-using load device, and the power supply controller uses the auxiliary power source to supply power to the DC-using load device and shuts down the AC/DC converter while the load detector detects low voltage for the DC-using load device.

In another aspect of the invention, a power source unit is devised. The power source unit includes an AC/DC (alternating current/direct current) converter to convert alternating current to direct current output, an auxiliary power source capable of storing electric power, a power supply mode designation unit to designate one of an operation mode and an energy save mode, in which the operation mode designating supply of high direct current output to a DC-using load device from the AC/DC converter and the energy save mode designating supply of power to a specific smaller load DC-using load device, and a power supply controller to control power supply according to a required load and a designated mode. When the power supply mode designation unit designates the operation mode, and a load to be required exceeds alternating current power source limits, the power supply controller shuts downs output of direct current from the AC/DC converter, and instead uses the auxiliary power source to supply power to the DC-using load device. When a load to be required is within alternating current power source limits, the power supply controller uses the AC/DC converter to supply power to the DC-using load device while the operation mode is set, and uses the auxiliary power source to supply power to the DC-using load device and shuts down the AC/DC converter while the energy save mode is designated by the power supply mode designation unit.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
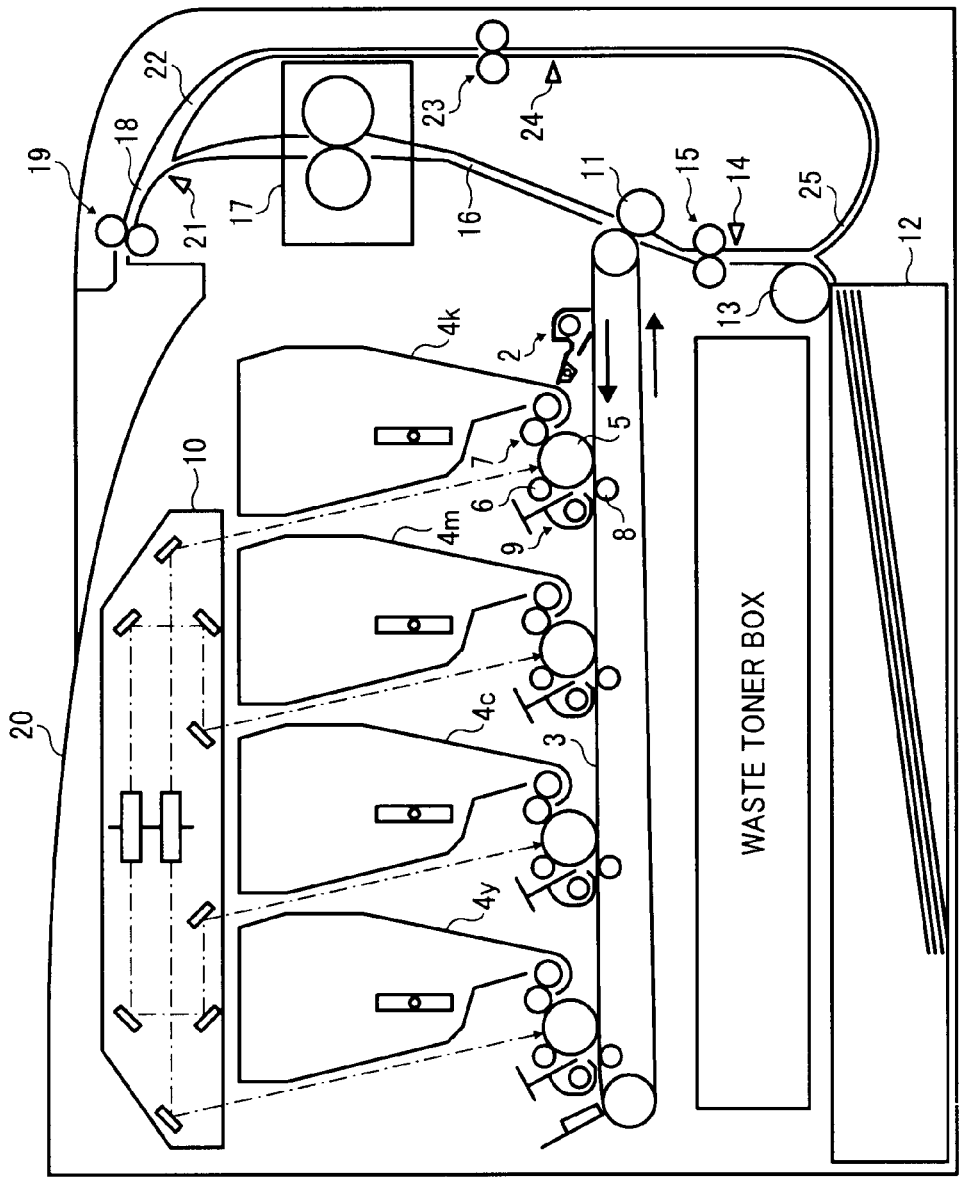
FIG. 1 shows a schematic configuration of an image forming apparatus employing a power source unit according to a first example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner.

Referring now to the drawings, a plurality of example embodiments for image forming apparatuses is described.

First Example Embodiment

FIG. 1 shows a schematic configuration of an image forming apparatus 1 according to a first example embodiment, in which an image forming system is schematically depicted. The image forming apparatus 1 may be a laser printer, but not limited thereto. A personal computer PC may be connected to the image forming apparatus 1 directly, or may be connected to the image forming apparatus 1 via a local area network (LAN), to which the image forming apparatus 1 and the personal computer PC are connected. A user can transmit a print instruction to the image forming apparatus 1 using the personal computer PC to conduct a print operation at the image forming apparatus 1.

The image forming apparatus 1 employs an image forming system of color electrophotography processing, in which image forming cartridges 4$k$, 4$c$, 4$m$, 4$y$ for K(black), C(cyan), M(magenta), Y(yellow) are used for printing each individual color image. Each of the image forming cartridges 4$k$ to 4$y$, a charge roller 6, a development unit 7 using toner as developer, and a cleaner 9 can be disposed around a photoconductor 5 such as a photoconductor drum, and the image forming cartridges 4$k$ to 4$y$ are arranged along a moving direction y (or sub-scanning direction) of a transfer belt 3 with a given pitch in a tandem manner. A laser scan unit 10, disposed over the image forming cartridges 4$k$ to 4$y$, emits laser beams corresponding to each of colors modulated from image data for each color, to the photoconductor 5 charged by the charge roller 6, and the laser scan unit 10 repeatedly scans the laser beam on the photoconductor 5 in a main scanning direction x, perpendicular to the moving direction y of transfer belt 3 to form an electrostatic latent image on the photoconductor 5. The electrostatic latent image is then developed as a toner image by the development unit 7. Each of toner images having different colors are sequentially and superimposingly transferred on the transfer belt 3 from each of the photoconductors 5 using the transfer roller 8 to form a color image on the transfer belt 3. Such superimposed toner images are transferred to a sheet at a position of secondary transfer roller 11, wherein the sheet is fed from a registration roller 15. The sheet having transferred toner images is then transported to a fusing unit 17 through a transport route 16, and then the sheet is applied with heat and pressure at the fusing unit 17 to fuse the toner images on the sheet. The sheet, passing the fusing unit 17, is then transported along a sheet ejection route 18, and then ejected to a sheet ejection tray 20 from an ejection port by a sheet ejection roller 19.

When a double-face printing operation is designated, the sheet may be transported as below. The sheet, passed through the fusing unit 17, is transported along the sheet ejection route 18, and then the sheet is to be ejected on the sheet ejection tray 20, which is an outside of ejection port of the sheet ejection roller 19. When the double-face printing operation is conducted, a rotation of the sheet ejection roller 19 in a standard direction (i.e., sheet ejection rotation) is stopped before the rear edge of sheet passes the sheet ejection roller 19. Then, the sheet ejection roller 19 sandwiching the sheet at the rear edge of sheet starts to rotate in a reverse direction (or inverted direction) to feed the sheet to a double-face transport pass (from the sheet ejection route 18, a sheet reverse route 22, a feed roller 23, to a reversed sheet feed route 25). Then, the sheet is transported and abutted to the registration roller 15 from the reversed sheet feed route 25, in which the sheet is stopped by abutting to the registration roller 15. Then, when a front edge of toner image (or front edge of image) transferred on the transfer belt 3 comes to a position of the secondary transfer roller 11, the registration roller 15 starts to rotate to feed the sheet to the secondary transfer roller 11 at a timing synchronized with a movement of the transfer belt 3 to transfer the toner images on the reversed face of sheet. The sheet having transferred toner images on the reversed face is then transported to the fusing unit 17 through the transport route 16, and then the sheet is applied with heat and pressure at the fusing unit 17 to fuse the toner images on the sheet. The sheet, passing the fusing unit 17, is then transported along the sheet ejection route 18, and then ejected to the sheet ejection tray 20 from an ejection port by the sheet ejection roller 19.

The sheet is fed from a sheet feed tray 12 to a sheet feed route 14 using a sheet feed roller 13, and then abutted and stopped at the registration roller 15. Then, the sheet is transported from the registration roller 15 to the transfer roller 11 at a given timing synchronized with a movement of the transfer belt 3.

Figure 2:
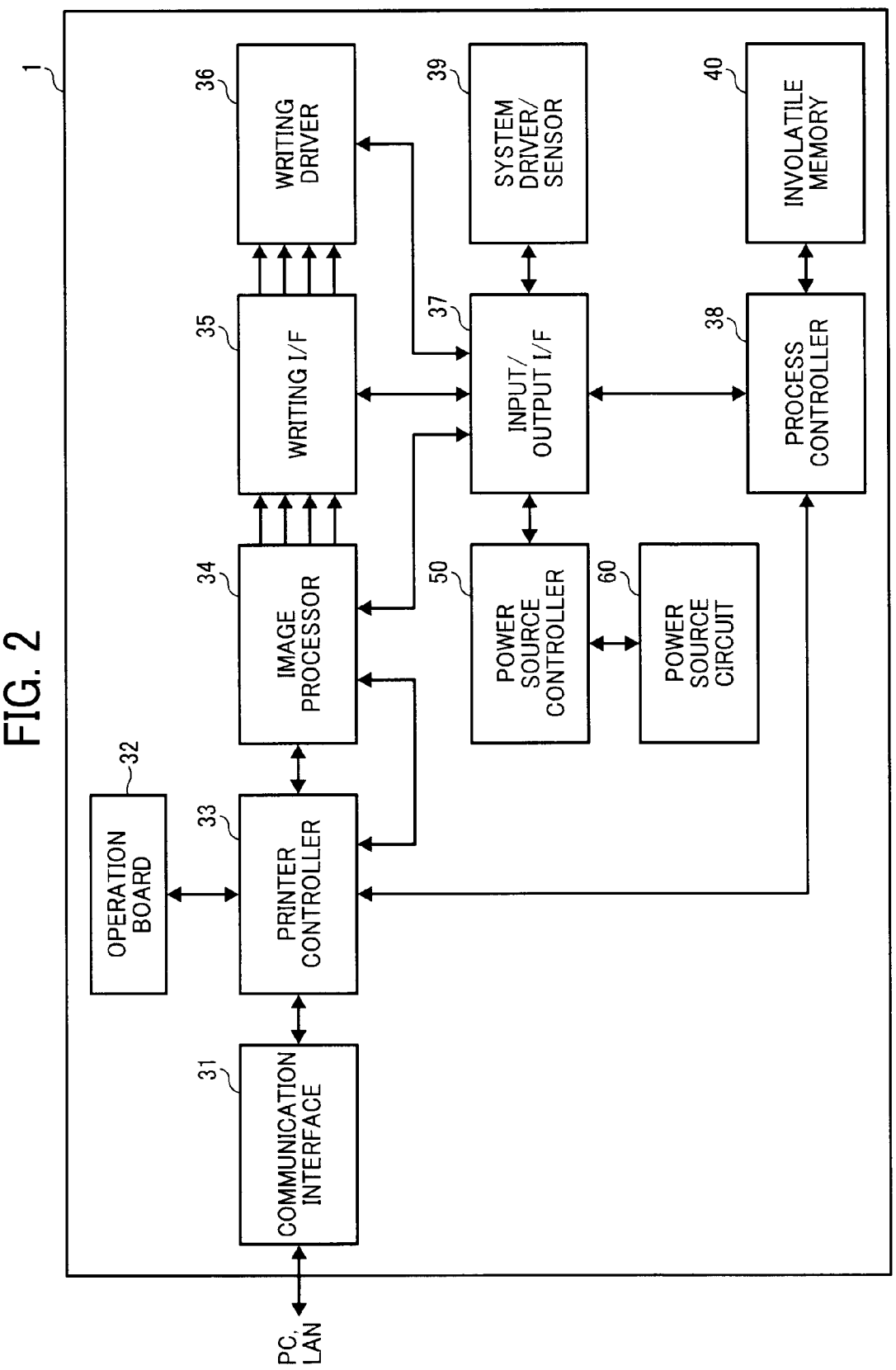
FIG. 2 shows a block diagram of an electrical system for the image forming apparatus 1 of FIG. 1.

FIG. 2 shows a block diagram of an image processing system in the image forming apparatus 1 of FIG. 1. A printer controller 33 may receive a print command from the personal computer PC via a communication interface 31. The personal computer PC may be connected to the image forming apparatus 1 directly, or may be connected to the image forming apparatus 1 indirectly via a network such as a LAN, Ethernet (registered trademark), or the like. The print command may include printing conditions such as sheet size, one-face/double-face printing, and writing image information. The printer controller may be also referred to a system controller.

The writing image information in the received print command is prepared as image data, and the image data is output to an image processor 34. Based on an image forming process control of a process controller 38, the image processor 34 converts the image data to image data of each color adapted to a printing process by the image forming system shown in FIG. 1, and loads the image data in an image memory of the image processor 34, and cuts a given required size of image data by changing magnification using a magnification ratio setting, and outputs the image data to a writing interface (I/F) 35. Based on the image data of each color, the writing I/F 35 drives or modulatingly drives ON/OFF of laser diodes of the laser scan unit 10 used for recording each of color images.

Various types of sensors and actuators (e.g., electrical motor, solenoid) disposed in the system of image forming apparatus 1 of FIG. 1 may be included in a system driver/ sensor 39, which is connected to an input/output (I/O) interface (I/F) 37. The process controller 38 reads detection signals of various types of sensors via the input/output I/F 37, and also drives an actuator of writing driver 36 via the input/output I/F 37. Further, the process controller 38 controls an operation timing and signal input/output timing for the image processor 34 and the writing I/F 35 via the input/output I/F 37.

The process controller 38 is connected to a power source controller 50 via the input/output I/F 37, and the power source controller 50 controls a power output of the power source circuit 60. The image forming apparatus 1 may further include an operation board 32, and a non-volatile memory 40.

Figure 3:
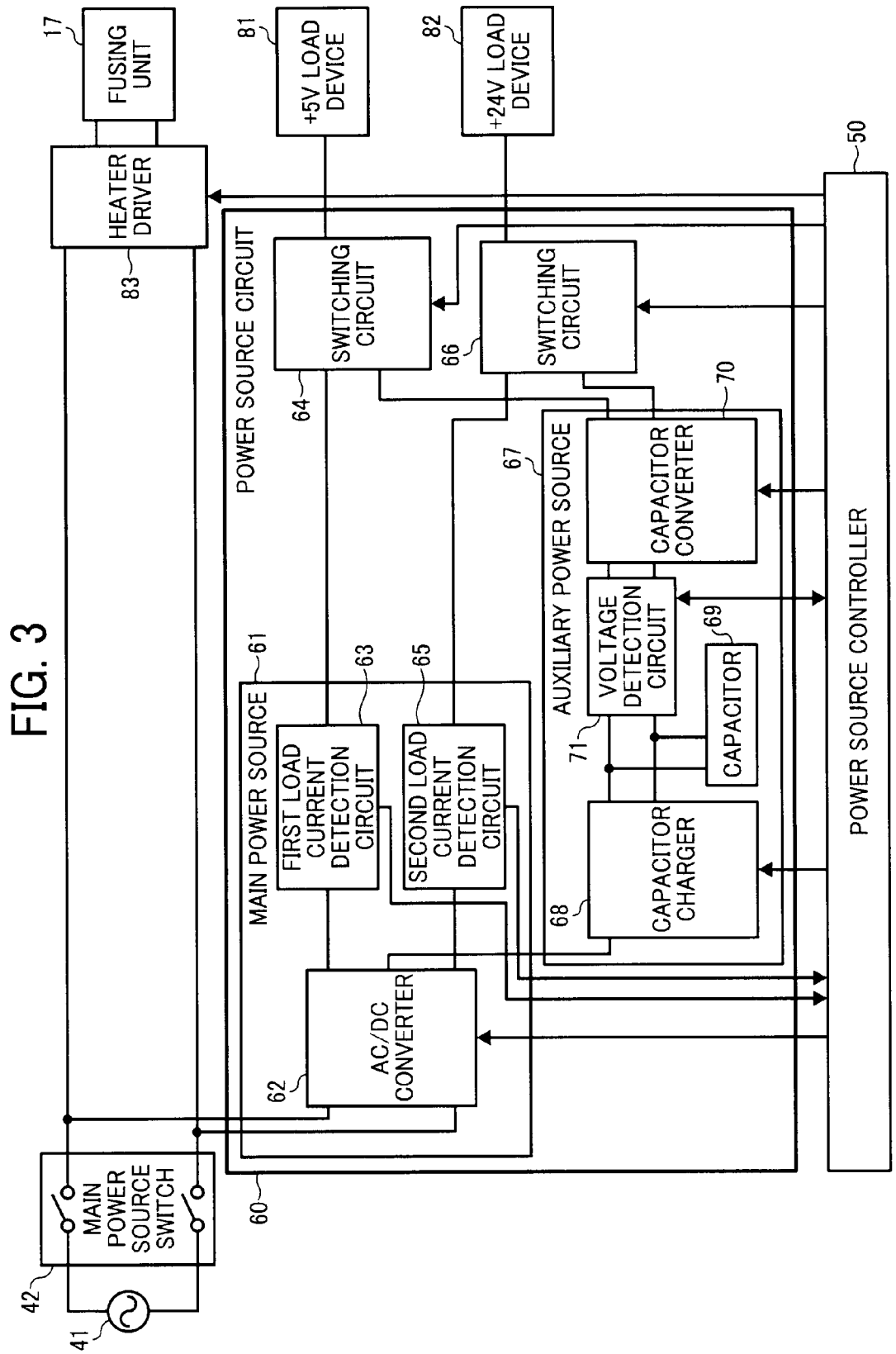
FIG. 3 shows one example block diagram of a power source circuit used for the configuration shown in FIG. 2.

FIG. 3 shows a block diagram of the power source circuit 60 of FIG. 2. An alternating current (AC) power source supplied from a commercial alternating current 41 (or AC line 41) via a main power source switch 42 is converted to DC (direct current) voltage by an AC/DC (alternating current/direct current) converter 62 disposed in a main power source 61, and then the DC voltage is supplied to each load device such as +5V load device 81 and +24V load device 82 via switching circuits 64 and 66. A charge voltage of a charge output terminal of the AC/DC converter 62 is applied to a capacitor charger 68 of an auxiliary power source 67, and used to charge a capacitor 69.

The capacitor 69 used as an auxiliary power source may be a capacitor having a greater capacity such as electric double layer capacitor or the like. Other than the electric double layer capacitor can be used as the capacitor 69. In example embodiments, the electric double layer capacitor, which can be charged and discharged within a shorter time and have a longer lifetime, may be used as the capacitor 69. Because the electric double layer capacitor has a characteristic that a terminal voltage becomes lower as the discharge progresses, the capacitor converter 70 is disposed after the capacitor 69 to set an output voltage at a constant level. Depending on the charge voltage and lowest usable voltage of the capacitor 69, the capacitor converter 70 can be selected from any one of a voltage increasing converter, a voltage decreasing converter, and a voltage increasing/decreasing converter. Further, a voltage detection circuit 71 is used to monitor the capacitor voltage.

Under a control of the power source controller 50, the switching circuit 64 supplies +5V power source to the +5V load device 81 by switching between one +5V power source, generated by the AC/DC converter 62 based on the AC power source supplied from the AC line 41, and another +5V power source, generated through the capacitor converter 70 using energy stored in the capacitor 69.

Further, under a control of the power source controller 50, the switching circuit 66 supplies +24V power source to the +24V load device 82 by switching between one +24V power source, generated by the AC/DC converter 62 based on the AC power source supplied from the AC line 41, and another +24V power source, generated through the capacitor converter 70 using energy stored in the capacitor 69.

Further, the main power source 61 may include a first load current detection circuit 63 to detect an output current of +5V power source output (as direct current output 1), and a second load current detection circuit 65 to detect an output current of +24V power source output (as direct current output 2) so that the load current of the +5V power source and +24V power source can be detected.

The power source controller 50 controls a mode shift such as from an "operation mode" to "energy save mode" and another mode shift such as from the "energy save mode" to "operation mode." The power source controller 50 also controls charge and discharge of the capacitor 69. When the commercial power source is set to ON from OFF, when an apparatus or machine is started up right after switching the mode from the energy save mode to operation mode, or when a given time period elapses after activating an apparatus or machine, +5V power source and +24V power source generated through the capacitor converter 70 using the energy stored in the capacitor 69 may be supplied to the +5V load device 81 and +24V load device 82, respectively, by switchingly using the switching circuits 64 and 66. During such period, a given amount of power supply from the AC line 41 can be used to control a heater driver 83, by which power supply amount to a fusing heater of the fusing unit 17 can be increased.

Figure 4:
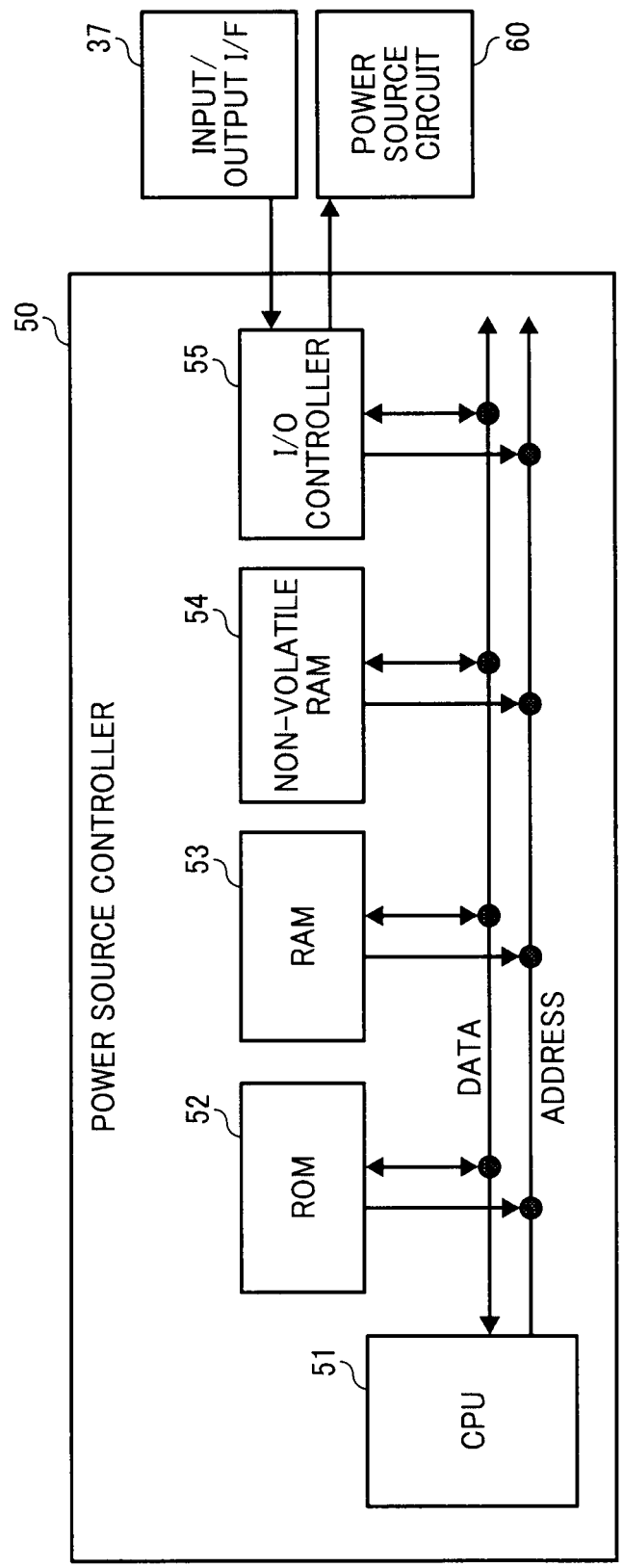
FIG. 4 shows one example block diagram of a power source controller for the configuration shown in FIG. 2.

FIG. 4 shows an example block diagram of the power source controller 50. The power source controller 50 may include a central processing unit (CPU) 51, a read only memory (ROM) 52, a random access memory a (RAM) 53, a non-volatile RAM 54, and an input/output (I/O) controller 55, for example. The CPU 51 controls the power source circuit 60 using program stored in the ROM 52, and program and data stored in the non-volatile RAM 54. The ROM 52 stores program to be run by the CPU 51. The RAM 53 is used as a working memory for the CPU 51. The non-volatile RAM 54 stores power consumption table, which stores power consumption data at operation condition of each individual load device, and printing process timetable, which stores time data required for printing process in the operation mode. The CPU 51 controls the power source circuit 60 in response to a control instruction from the process controller 38 via the input/output I/F 37.

Figure 18:
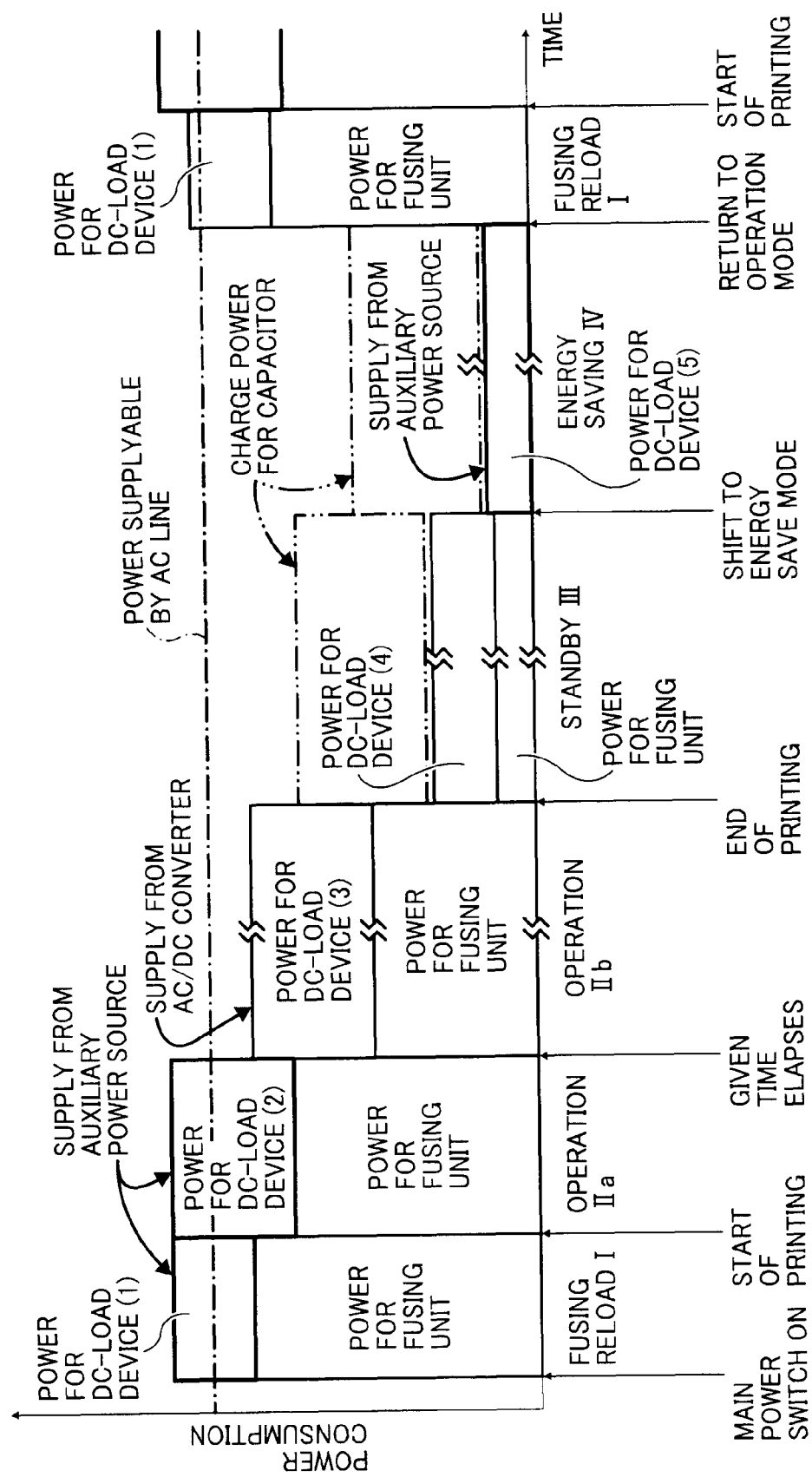
FIG. 18 shows a timing chart of power supply mode to an alternating current load and a direct current load of FIG. 3.

FIG. 18 is an example time chart, which shows an example power consumption transition pattern of the image forming apparatus 1, in which the image forming apparatus 1 can be activated to a printable condition by setting ON to the main power source switch 42 (FIG. 3). The horizontal axis of FIG. 18 shows time, and the vertical axis of FIG. 18 shows a total power consumption of the image forming apparatus 1. The dashed dotted line indicates an upper power limit of commercial alternating current supplyable from the AC line 41.

In the fusing reload operation period I, right after setting ON to the main power source switch 42, power greater than a normal time is supplied to the fusing heater of fusing unit 17 to increase the fusing temperature of the fusing unit 17 to a temperature that can be used for printing as quickly as possible, by which a given start-up time period required for the image forming apparatus 1 can be satisfied. In the fusing reload operation period I, the +5V load device 81 and the +24V load device 82 are supplied with power from the auxiliary power source 67, and thereby the fusing unit 17 can be sufficiently supplied with power from the AC line 41, by which a start-up time can be shortened. Then, after the fusing reload operation period I, the operation period IIa having a given time period elapses, in which power is also supplied to a DC-load device such as load devices 81 and 82 from the auxiliary power source 67 as similar to the fusing reload operation period I, which is the activation period of the apparatus. Once the temperature of the fusing unit 17 reaches a fusible temperature, power supply to the fusing heater can be reduced compared to the activation period such as fusing reload operation period I to maintain the temperature in the fusing unit 17. Accordingly, when a given time elapses for the operation period IIa, another operation period IIb starts, in which the AC/DC converter 62 supplies power to the DC load such as load devices 81 and 82, and the power supply from the auxiliary power source 67 stops. If the power supply to the fusing unit 17 is set greater than the normal time, the power supply to the fusing unit 17 is adjusted to a level at the normal time.

During the operation periods IIa and IIb, the image forming apparatus 1 may be in a printing period. After the completion of printing operation, the standby period III starts. During the standby period III, the fusing heater is supplied with a smaller amount of power to maintain the temperature of the fusing unit 17 at a level that can be shifted to the fusing temperature once a print instruction is issued without the fusing reload operation period I or with a shorter time of the fusing reload operation period I. As such, the apparatus is waiting to receive the print instruction in the standby period III.

When the standby period III continues for a given time period (i.e., no print instruction is issued in the given time period), the energy saving period IV starts. In the energy saving period IV, the power source controller 50 sets the OFF condition for the heater driver 83 so that power is supplied only to an energy saving load device, included in the +5V load device 81, by adjusting the power source circuits 83 and 60 shown in FIG. 3. During the energy saving period IV, when an given input, used for the energy saving load to return to the operation mode, is detected or a condition change to return the energy saving load to the operation mode occurs, the CPU 51 of power source controller 50 including sets the power source circuits 83 and 60 to the operation mode in response to such input or condition change. Further, during the energy save mode, power is supplied to the CPU 51 of power source controller 50 from a power supply line (not shown) for energy saving load.

Figure 19:
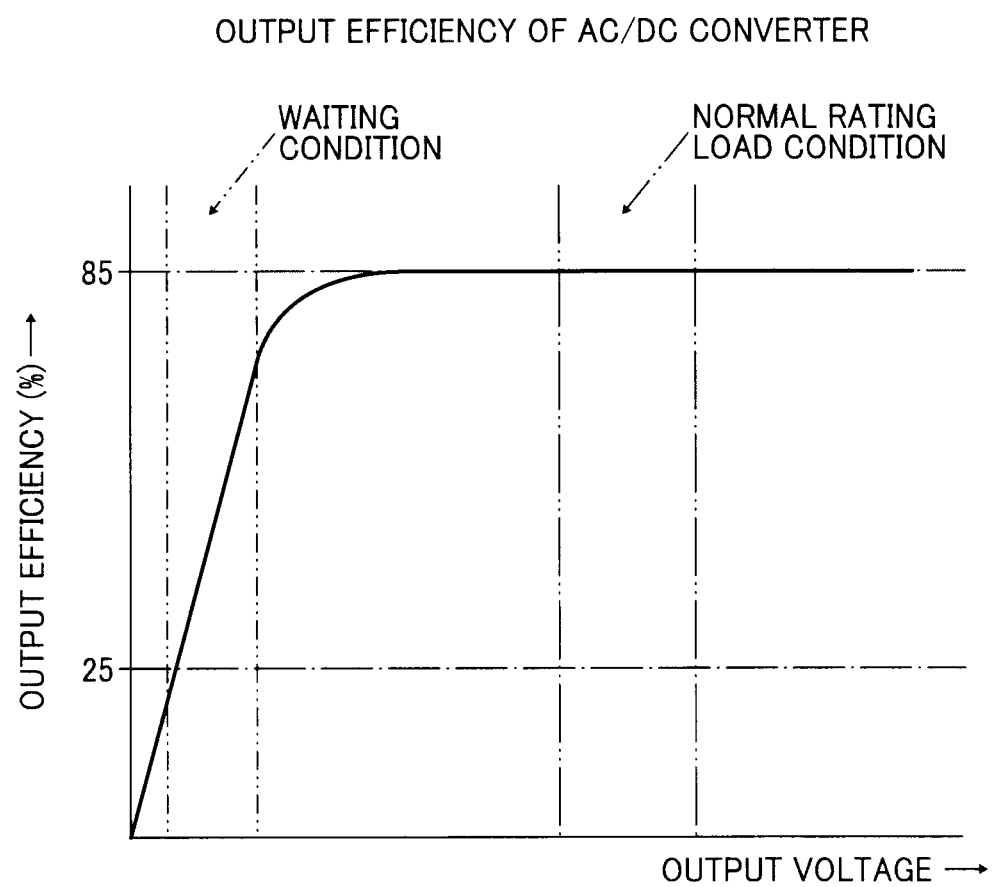
FIG. 19 shows a graph of output efficiency of AC/DC converter in relation to an output power of AC/DC converter.

FIG. 19 shows an output efficiency of AC/DC converter 62 with respect to output voltage load, which shows different AC/DC conversion efficiency for different voltage loads. For example, when the AC/DC converter 62 supplies power to a load device at the energy save mode (e.g., see power (5) for DC load device in FIG. 18), the output efficiency of AC/DC converter 62 may become 25%. On one hand, when the AC/DC converter 62 supplies power to a load device at a normal rating load condition (see power (2) and (3) for DC load device in FIG. 18), the output efficiency of AC/DC converter 62 may become 85% as shown in FIG. 19. If the charge and discharge efficiency of auxiliary power source 67 is set to 80%, the charge and discharge efficiency can be computed as follows.
1) When AC/DC conversion is conducted under the energy save mode (or waiting condition), the AC/DC conversion efficiency becomes 25%.
2) When energy is stored under the normal rating load condition, and discharged under the energy save mode, the AC/DC conversion efficiency becomes 68% (=85%×80%).

Accordingly, the efficiency of the power source circuit 60 can be enhanced by supplying power to the DC load devise (such as load devises 81, 82) from the AC/DC converter 62 under the normal rating load condition (operation mode), and by supplying power to the energy saving load devise from the auxiliary power source 67 under the energy save mode (or waiting condition). Such configuration can reduce power loss, by which energy consumption can be reduced.

Figure 5:
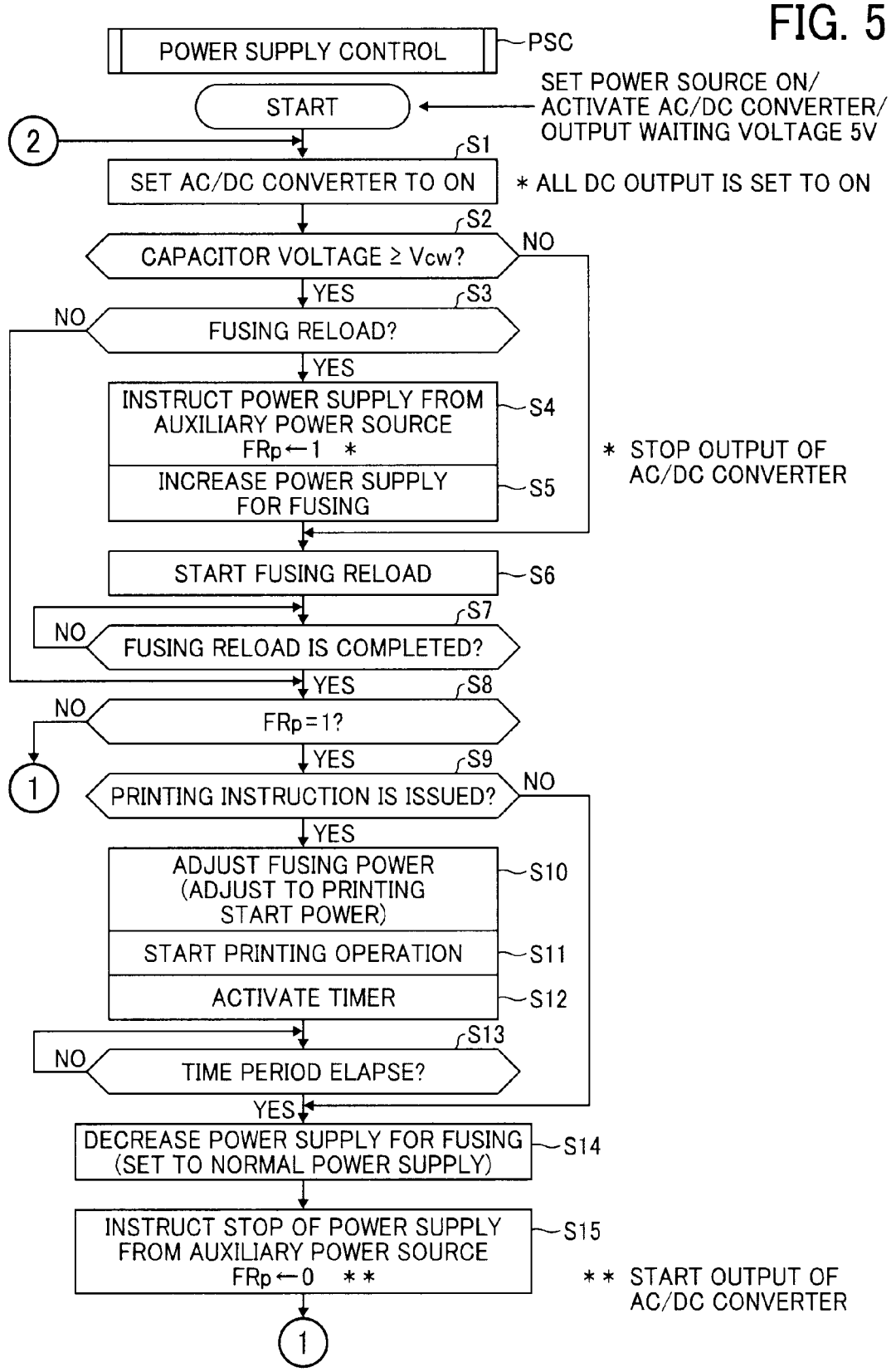
FIG. 5 shows one part of a flowchart of power supply control conductible by a CPU shown in FIG. 4.
Figure 6:
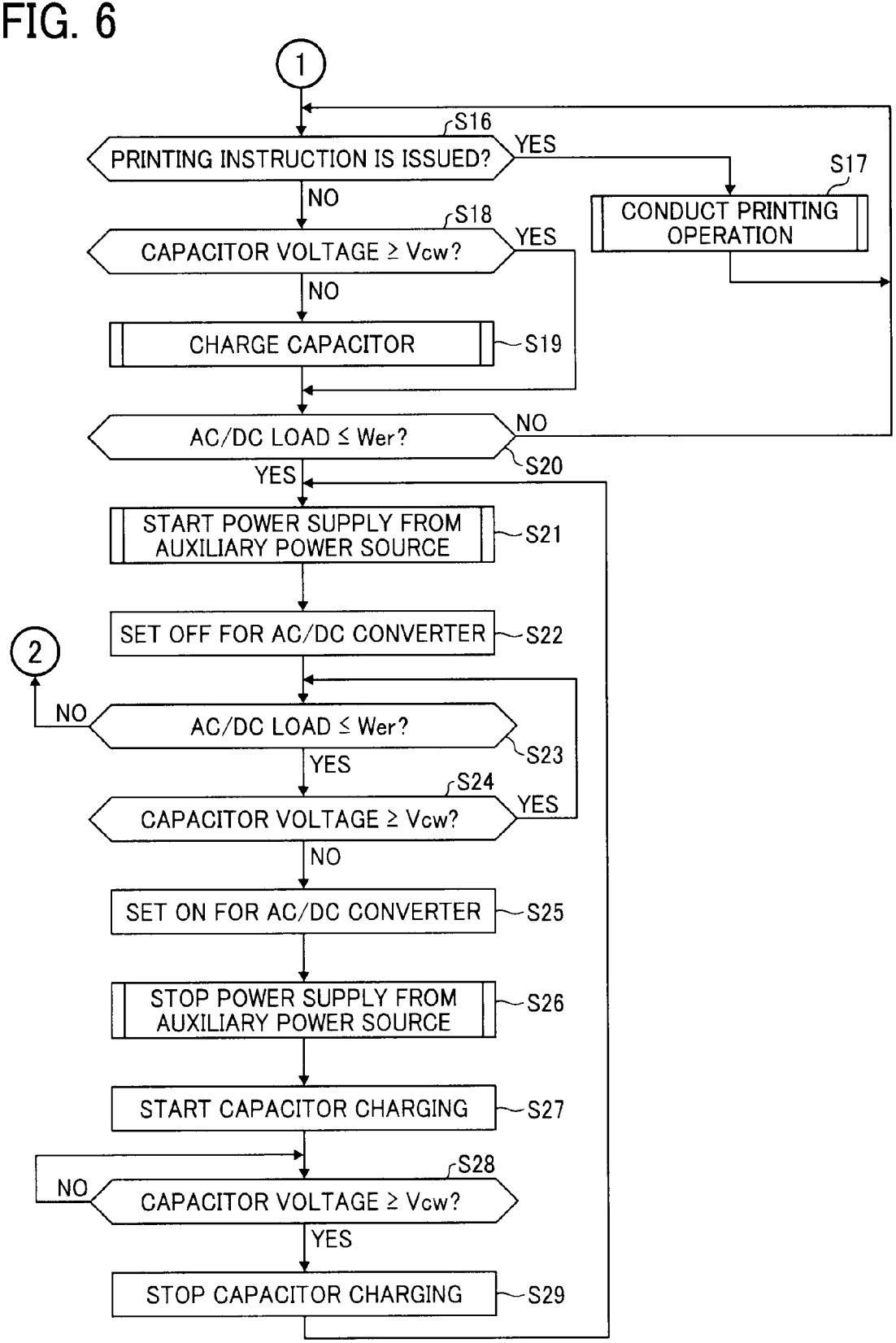
FIG. 6 shows a continuation of the flowchart shown in FIG. 5.

FIGS. 5 and 6 show a flowchart of one example process for power supply control (PSC) conductible by the power source controller 50 (or CPU 51) right after a given operation voltage is applied to each device in the image forming apparatus 1 to conduct a printing operation, wherein such operation voltage may be applied when the main power source switch 42 is switched from OFF to ON or when the energy save mode returns to the operation mode.

First, FIG. 5 is referred. When a given operation voltage is applied to each device in the image forming apparatus 1 to conduct a printing operation (i.e., the operation mode), the power source controller 50 sets a connection switch for connecting the voltage detection circuit 71 to a voltage detection terminal of the capacitor 69 to ON to read a level of voltage detection signal of the voltage detection circuit 71 by conducting AC/DC conversion, and determines whether the voltage detection signal is a charge starting threshold Vcw or more (steps S1 and S2). Then, the connection switch is set to OFF. As such, during a time that checking of the capacitor voltage is not necessary, the voltage detection circuit 71 is disconnected from the voltage detection terminal of capacitor 69 to prevent discharging of the capacitor 69 through the voltage detection circuit 71.

If the capacitor voltage, read by the AC/DC conversion, is the charge starting threshold Vcw or more, the power source controller 50 checks conditions of each unit in the image forming apparatus 1 (step S3). At step S3, it is determined whether the fusing reload operation, that is fusing temperature start-up operation, is required. Specifically, if it is determined that the fusing reload operation is required right after the main power source switch 42 is set to ON, or when the energy save mode returns to the operation mode, the capacitor converter 70 is driven, and power supply to the +5V load device 81 and +24V load device 82 by the auxiliary power source 67 via the switching circuits 64 and 66, required for conducting an image forming operation including a fusing step, is designated.

To designate a power supply from the auxiliary power source 67, an instruction information "1" is written on a register FRp, set at one area of an internal memory of the power source controller 50, wherein the instruction information "1" instructs power supply using the auxiliary power source 67 (step S4).

In response to setting of such instruction information "1," a timer interruption is activated to drive the auxiliary power source 67, in which a power supply (or voltage output) from the auxiliary power source 67 is started, and the switching circuits 64 and 66 switch a power supply source for the load devices 81 and 82 to the auxiliary power source 67. Specifically, the load devices 81 and 82, connected to the main power source 61, switch a power connection to the auxiliary power source 67, and an output of the AC/DC converter 62 is stopped.

Further, the power source controller 50 increases power supplyable to the fusing heater of the fusing unit 17 (step S5), and starts the fusing reload operation (step S6).

However, if the capacitor voltage, read after the AC/DC conversion, is less than the charge starting threshold Vcw, the above described switching of power supply (i.e., power supply from the auxiliary power source 67) is not conducted, and supplyable power increase to the fusing unit 17 is not also conducted, and then the fusing reload operation starts (steps S2 and S6).

Then, it is confirmed whether the fusing reload operation completes (step S7). When the completion of fusing reload operation is confirmed, data of the register FRp is checked (step S8). If the register FRp has data of "1" (i.e., power being supplied from the auxiliary power source 67), the process goes to a printing control of steps S8 to S14 while a power supply from the auxiliary power source 67 is continued, and it is determined whether an operator issues a printing instruction (step S9).

If the printing instruction is issued, and the fusing supply power is required to switch to a power for the fusing reload operation, the fusing supply power is switched to a power required for starting the printing (step S10), and starts a printing operation while supplying power from the auxiliary power source 67 to the load devices 81 and 82 (step S11).

After starting the printing operation (or image forming operation), a timer is activated (step S12), and then it is confirmed whether a given time period elapses (step S13). If it is confirmed that the given time period elapses (specifically, when the timer becomes a time over), the fusing supply power is switched to a power supply under a normal printing condition (step S14), in which an output of the AC/DC converter 62 is started to output, and then the switching circuits 64 and 66 switch the power supply for the load devices 81 and 82 to the AC/DC converter 62 of the main power source 61, wherein the AC/DC converter 62 generates the +5V and +24V power source. Then, the capacitor converter 70 stops its operation (i.e., outputting of power), and the instruction information "1" in the register FRp is cleared (step S15), wherein the instruction information "1" indicates a power supplying condition from the auxiliary power source 67 to the load devices 81 and 82, in which data of the register FRp is set to instruction information "0," which instructs a stop of power supply from the auxiliary power source 67 to the load devices 81 and 82.

Further, if no printing instruction is issued after completing the fusing reload operation, at a timing that the fusing reload operation (fusing temperature start-up) has completed (step S14), the fusing supply power is switched to a fusing temperature maintaining power, at which a print start instruction is awaited and the driving (i.e., voltage output) of auxiliary power source 67 is stopped, and the register FRp is cleared (step S15), in which data of the register FRp is updated to the instruction information "0," which instructs a stop of power supply from the auxiliary power source 67.

In response to a setting of the instruction information "0," a timer interruption is activated to switch a power supply for the load devices 81 and 82 from the auxiliary power source 67 to the main power source 61 via the switching circuits 64 and 66. As such, the power supply (or voltage output) from the auxiliary power source 67 stops. Specifically, a power connection for the load devices 81 and 82 is switched from the auxiliary power source 67 to the main power source 61.

Next, FIG. 6 is referred. After step S15, if the printing instruction is issued, the printing operation is conducted (steps S16 and S17). Further, if the register FRp is set with data of instruction information "0" (indicating stop of power supply from the auxiliary power source 67) right after the completion of fusing reload operation (step S8), the process similarly goes to a printing control (steps S16 and S17) while stopping a power supply from the auxiliary power source 67.

If the fusing temperature decreases significantly during a printing operation under the print control of stopping the power supply from the auxiliary power source 67 (steps S16 and S17), the power supply from the auxiliary power source 67 is re-started, as similar to steps S4 to S6, to start-up the fusing temperature rapidly, and when the fusing temperature increases, the power supply from the auxiliary power source 67 is stopped as similar to steps S14 and S15.

Further, if no printing operation is to be conducted and the mode is a waiting mode of the printing instruction (standby period III), the voltage of the capacitor 69 is read, and it is determined whether the charging of the capacitor 69 is required (step S18), in which it is determined whether the capacitor voltage is the charge starting threshold Vcw or more (capacitor voltage≧Vcw?). If it is determined that the charging is required, the capacitor 69 is charged (step S19).

If no printing operation is conducted, and a given setting time continues for waiting of printing instruction (i.e., standby period III in waiting mode), and a charging is not necessary for the capacitor 69, the process shifts to the energy save mode (steps S20 and subsequent steps) while forbidding a timer interruption (step S21). Specifically, when the standby period III continues for the given setting time and the capacitor 69 is in charging, and after the charging is completed (steps S18 and S19), a timer interruption is forbidden, and sifts to the energy save mode (steps S20 and subsequent steps).

When it is shifted to the energy save mode, the detection current of the second load current detection circuit 65 decreases to zero or so, and the detection current of the first load current detection circuit 63 decreases significantly. A threshold value "Wer" is used for the AC/DC converter to determine whether the mode is shifted to the energy save mode. If the AC/DC load becomes threshold value Wer or less, the mode is shifted to the energy save mode.

In response to such decrease of detection current, the power source controller 50 sets the heater driver 83 to OFF, and sets a power supply for an energy saving load device included in the +5V load device 81 from the auxiliary power source 67, and sets the AC/DC converter 62 to OFF (i.e., stop of output from the AC/DC converter 62) (steps S20 to S22).

In this energy save mode, the power source controller 50 monitors voltage of the capacitor 69, in which the charge voltage may correspond to remaining power amount of the capacitor 69. Further, the power source controller 50 monitors whether the first load current detection circuit 63 and the second load current detection circuit 65 detect a current generation (step S23), in which the AC/DC converter 62 may output voltage due to a shift to the operation mode. When the current generation is detected, the process goes to step S1 of FIG. 5, and the above described power supply control (PSC) starts.

If the voltage of capacitor 69 decreases to a level less than a given setting value during the energy save mode, that is the remaining power becomes low (step S24), the power source controller 50 sets the AC/DC converter 62 to ON to supply power to an energy saving load device from the AC/DC converter 62, and stops output from the auxiliary power source 67, and the capacitor charger 68 is set to ON to charge the capacitor 69 using the AC/DC converter 62 (step S23 to S27). After completing the charging, the charging to the auxiliary power source 67 stops, and then the auxiliary power source 67 re-starts a power supply to the energy saving load device, and the AC/DC converter 62 is set to OFF (step S22).

When the AC/DC converter 62 supplies power to the energy saving load device during the energy save mode, the power amount supplied to the energy saving load device is low, but, at the same time, the AC/DC converter 62 supplies charging power to the auxiliary power source 67. Accordingly, the AC/DC converter 62 outputs a higher (or greater) direct current, and thereby an output efficiency of the AC/DC converter 62 can be set high. Accordingly, the power loss of power source unit can be low.

Second Example Embodiment

In the first example embodiment, the first and second load current detection circuits 63 and 65 are used as a load detector to detect high/low level of direct current output, supplied from the AC/DC converter 62 to the direct current load devices 81 and 82. However, if any one of the operation mode and the energy save mode is set as described in the first example embodiment, the power supply by the power source circuits 83 and 60 can be controlled when the mode is switched between the operation mode and energy save mode without waiting a load change of load device corresponding to such mode setting. In a second example embodiment, the power supply by the power source circuits 83 and 60 are controlled in response to switching between the operation mode and energy save mode.

Figure 7:
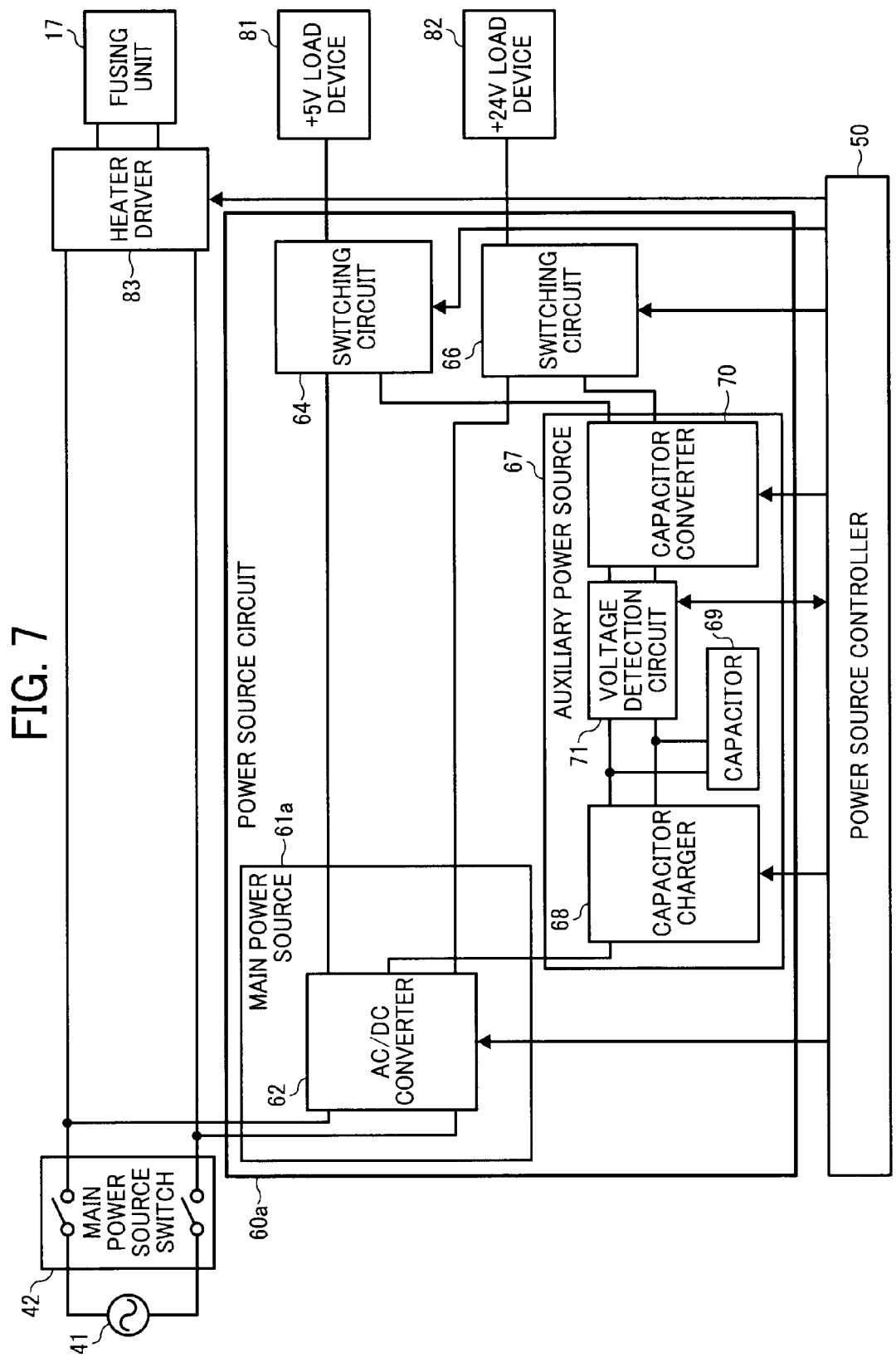
FIG. 7 shows a block diagram of a power source circuit according to a second example embodiment.

FIG. 7 shows schematic configuration of a power source circuit 60*a* according to the second example embodiment. The power source circuit 60*a* can be prepared by omitting the first and second load current detection circuits 63 and 65 from the power source circuit 60 of the first example embodiment. The first half of power supply control by the CPU 51 of power source controller 50 of the second example embodiment is same as the first example embodiment shown in FIG. 5. The second half of power supply control of the second example embodiment is slightly different from the first example embodiment as shown in FIG. 8.

Figure 8:
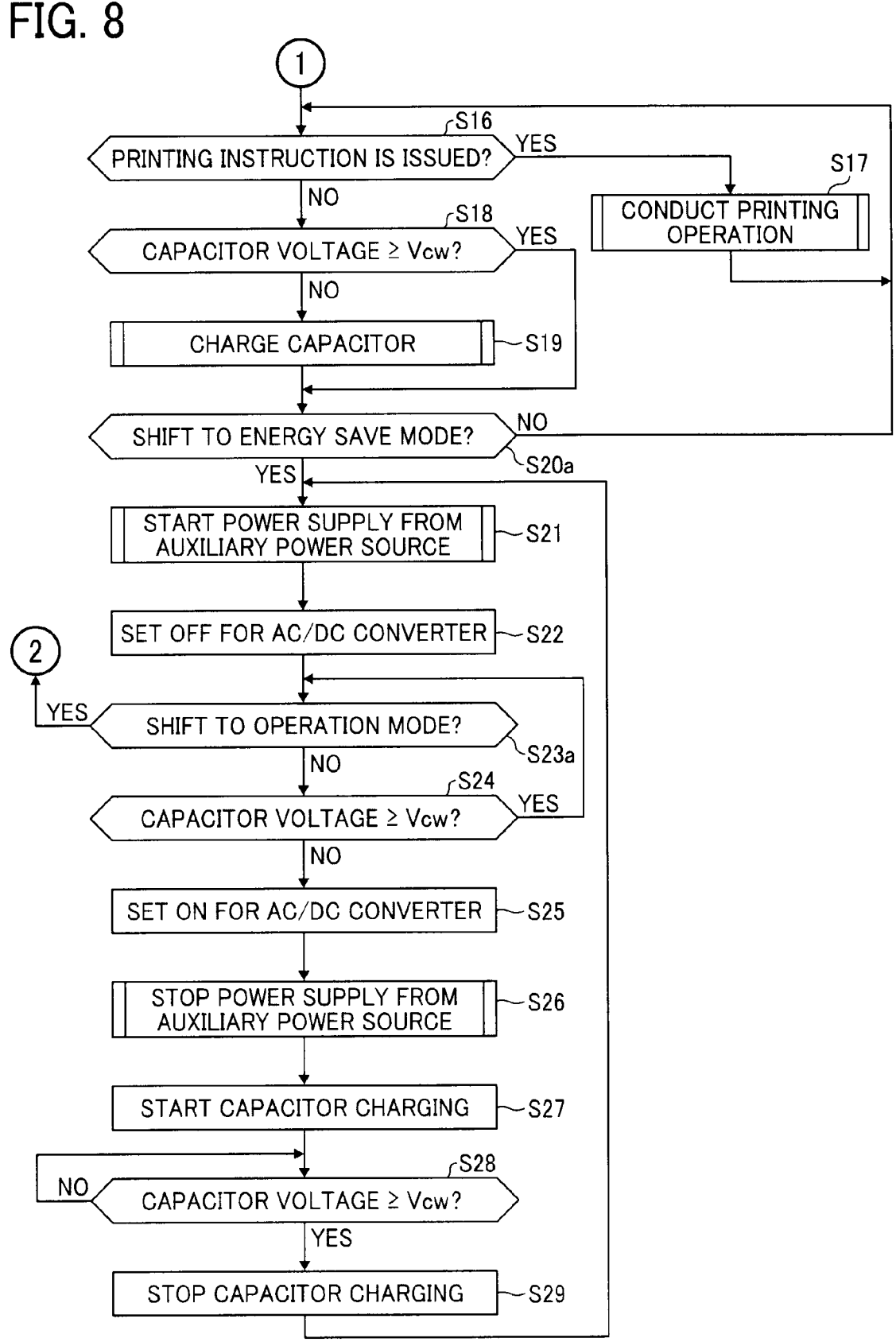
FIG. 8 shows another continuation of the flowchart shown in FIG. 5 according to a second example embodiment conductible by a CPU.

FIG. 8 shows the second half of power supply control of the second example embodiment. Steps S20 and S23 of the power supply control process of the first example embodiment shown in FIG. 6 check high/low level of DC-using load device, and such steps S20 and S23 are changed to steps S20*a* and S23*a* to check a mode shift between the energy save mode and operation mode in the second example embodiment. With such a configuration, in the second example embodiment, during the energy save mode, the auxiliary power source 67 supplies power to the load devices 81 and 82, and the AC/DC converter 62 is set to OFF. Further, during the operation mode, the AC/DC converter 62 supplies power to the load devices 81 and 82, and the auxiliary power source 67 is set to OFF. Other configurations and functions of the second example embodiment are same as the first example embodiment.

Third Example Embodiment

In the power source circuits 60 and 60*a* of the first and second example embodiments, the auxiliary power source 67 is charged using the direct current output of AC/DC converter 62. However, in a third example embodiment, the auxiliary power source 67 is charged using the commercial alternating current 41.

Figure 9:
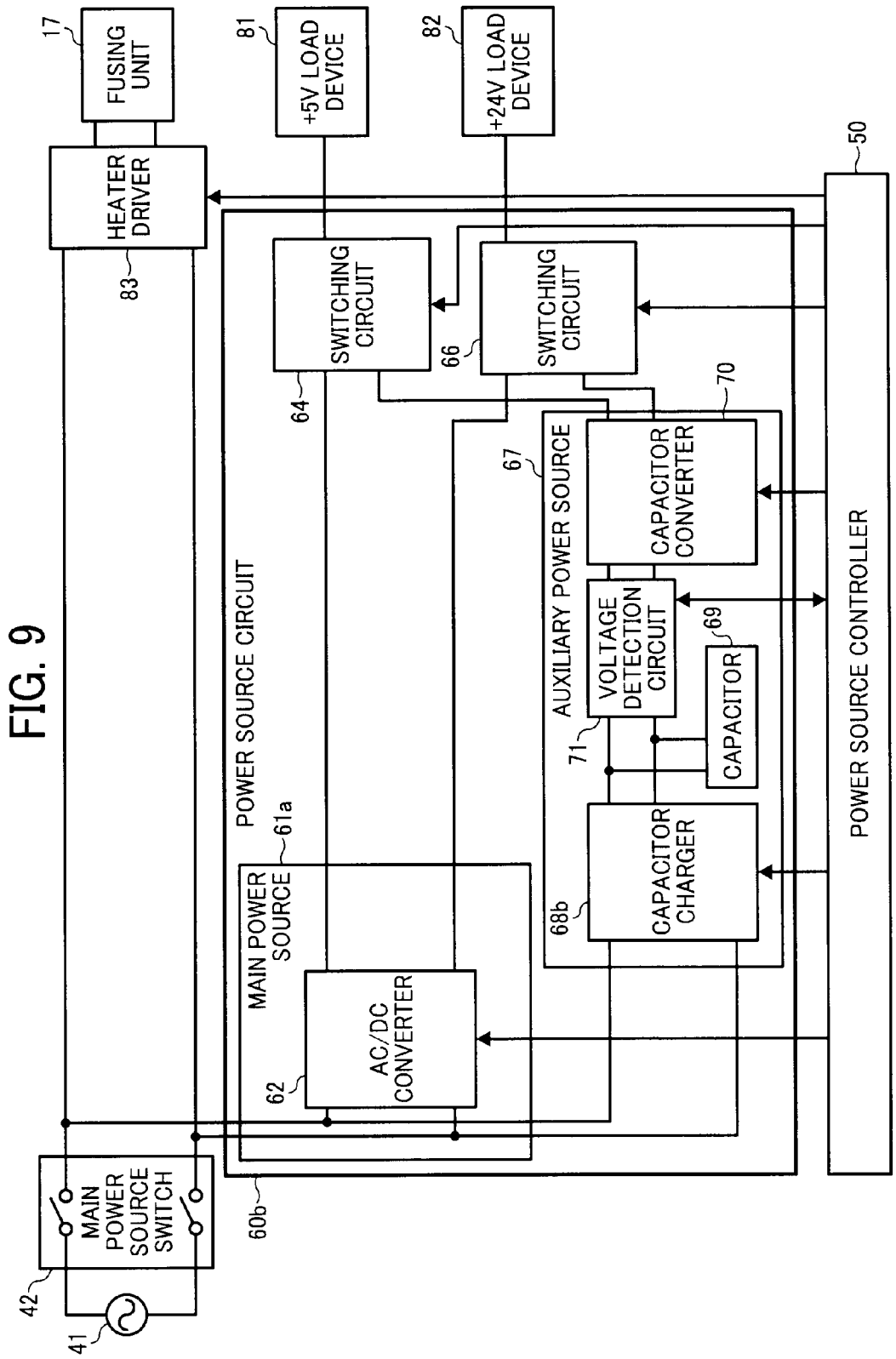
FIG. 9 shows a block diagram of a power source circuit according to a third example embodiment.

FIG. 9 shows a schematic configuration of a power source circuit 60*b* according to the third example embodiment. The power source circuit 60*a* can be prepared by omitting the first and second load current detection circuits 63 and 65 from the power source circuit 60 of the first example embodiment. The capacitor charger 68*b* of the auxiliary power source 67 may be installed with a rectification circuit to convert a commercial alternating current input to direct current, and an electric circuit after the rectification circuit is same as the first and second example embodiments. As similar to the second example embodiment, in the third example embodiment, during the energy save mode, the auxiliary power source 67 supplies power to the load device 81, and when remaining power amount of the capacitor 69 of the auxiliary power source 67 decreases to a given low level, the power supply for the load device 81 is switched to the AC/DC converter 62.

In the third example embodiment, the auxiliary power source 67 is charged by the commercial alternating current 41, by which the AC/DC converter 62 supplies power only to an energy saving load device included in the load device 81, and thereby the output efficiency may decrease significantly. Accordingly, in the third example embodiment, the AC/DC converter 62 may be set as a converter switchingly operable at a lower frequency. Therefore, when remaining power amount of the auxiliary power source 67 decreases to a given low level during the energy save mode, and the power supply from the auxiliary power source 67 to an energy saving load device included in the load device 81 becomes difficult, the power supply for the energy saving load device is switched to the AC/DC converter 62 operable at the lower frequency, in which the AC/DC converter 62 is operable at a lower frequency mode.

The first half of power supply control by the CPU 51 of power source controller 50 of the third example embodiment is same as the first example embodiment shown in FIG. 5. The second half of power supply control of the third example embodiment is slightly different from the first example embodiment as shown in FIG. 10.

Figure 10:
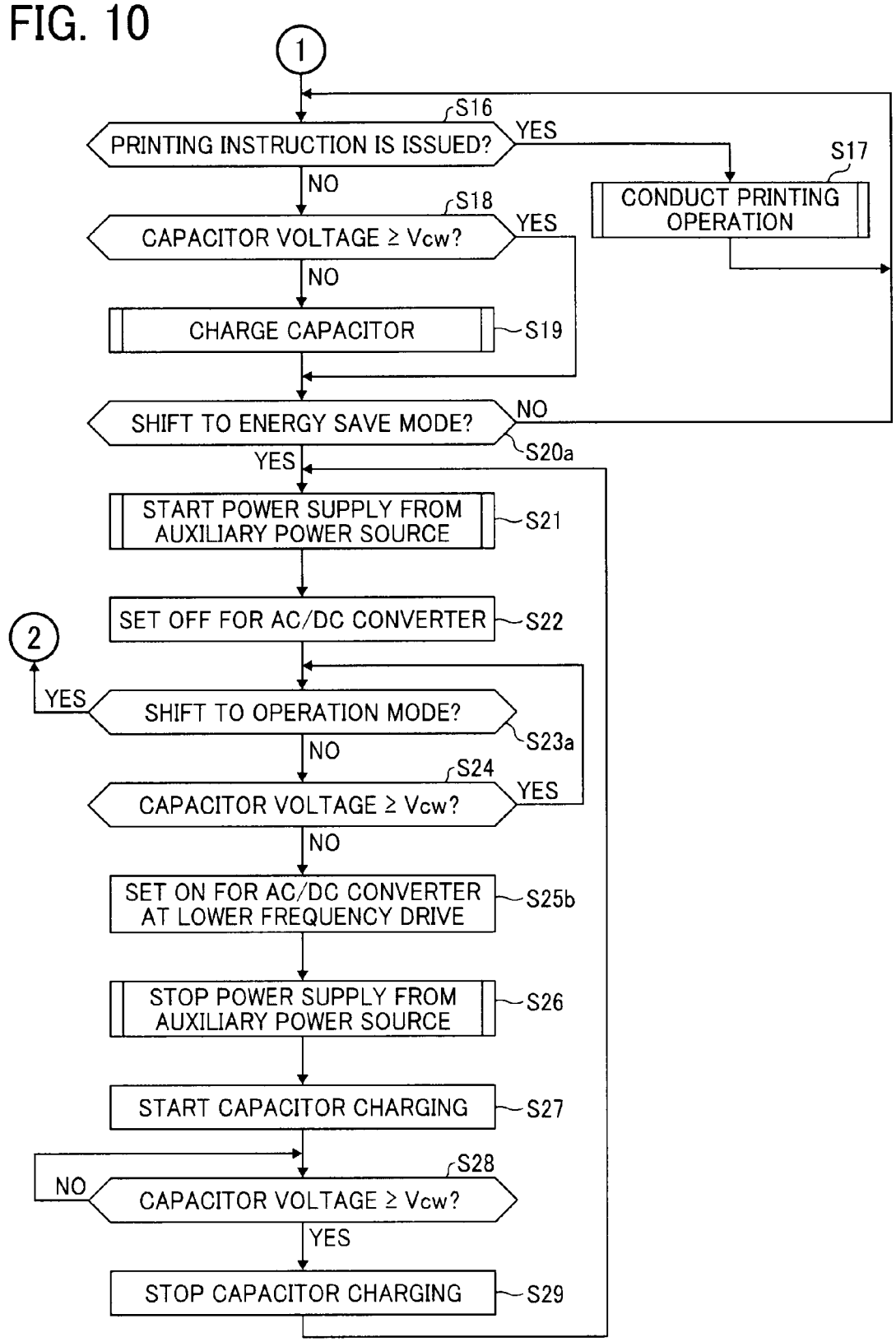
FIG. 10 shows another continuation of the flowchart shown in FIG. 5 according to a third example embodiment conductible by a CPU.

FIG. 10 shows the second half of power supply control of the third example embodiment. Steps S20 and S23 of the power supply control process checking high/low level of DC-using load device of the first example embodiment shown in FIG. 6 are changed to steps S20*a* and S23*a* to check a mode shift between the energy save mode and operation mode in the third example embodiment. Further, step S25 (see FIGS. 6 and 8) of setting ON for the AC/DC converter 62 during the energy save mode is changed to step S25*b*, in which the AC/DC converter 62 is switched to be operated or driven at a lower frequency.

With such a configuration, in the third example embodiment, during the energy save mode, the auxiliary power source 67 supplies power to the load devices 81 and 82, and the AC/DC converter 62 is set to OFF. During the operation mode, the AC/DC converter 62 supplies power to the load devices 81 and 82, and the auxiliary power source 67 is set to OFF. When remaining power amount of the auxiliary power source 67 decreases to a given low level during the energy save mode, and the power supply from the auxiliary power source 67 to an energy saving load device included in the load device 81 becomes difficult, the power supply to the energy saving load device is switched to the AC/DC converter 62 operable at the lower frequency (step S25*b*). When such lower frequency switching configuration is employed, switching numbers of frequency per predetermined unit time can be reduced, by which switching loss can be reduced, and the power loss of AC/DC converter 62, which may occur when supplying power to an energy saving load device at a low (or light) load condition, can be reduced. Other configurations and functions of the third example embodiment are same as the first example embodiment.

Fourth Example Embodiment

The first half of power supply control by the CPU 51 of power source controller 50 of the fourth example embodiment is same as the first example embodiment shown in FIG. 5. The second half of power supply control of the fourth example embodiment is slightly different from the first example embodiment as shown in FIG. 11.

In the control configuration of first example embodiment, when the charge amount of the auxiliary power source 67 becomes smaller, the AC/DC converter 62 supplies power to the load device at the low (or light) load condition (see steps S16, S18 to S26 of FIG. 6), in which the AC/DC converter 62 may be driven at a low AC/DC conversion efficiency.

Figure 11:
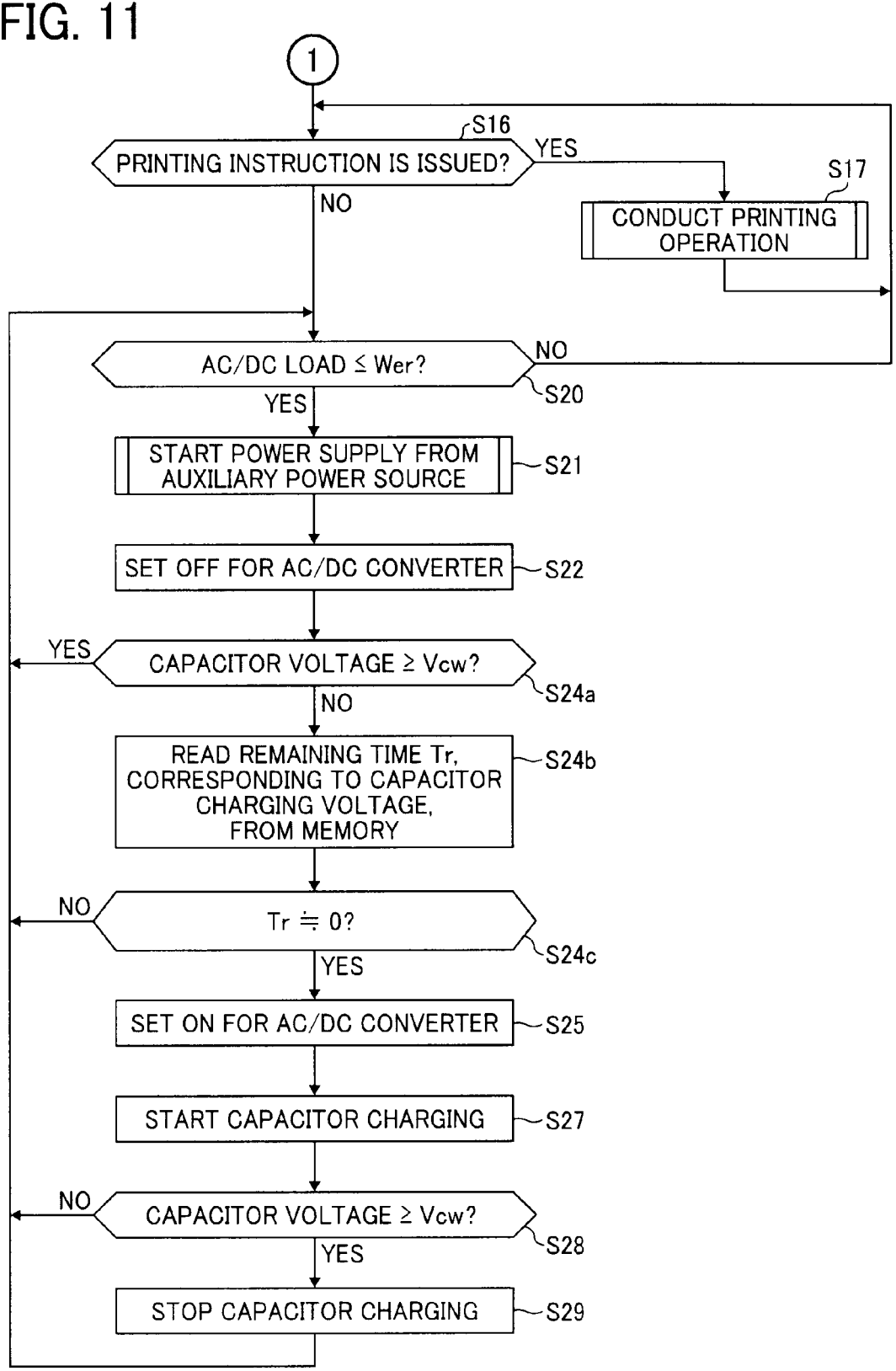
FIG. 11 shows another continuation of the flowchart shown in FIG. 5 according to a fourth example embodiment conductible by a CPU.

In the fourth example embodiment of FIG. 11, without relevancy of high/low level of the charge voltage of the capacitor 69, when power is supplied to a DC-using load device at a low (or light) load condition, the AC/DC converter 62 is set to OFF, and the auxiliary power source 67 supplies power to the DC-using load device (steps S16, S20 to 22). During such power supply, the high/low of the charge voltage of capacitor 69 is detected. If the charge voltage becomes less than a given value such as the charge starting threshold Vcw, the AC/DC converter 62 starts to charge the auxiliary power source 67 before the auxiliary power source 67 becomes a condition of incapable of power supply (step S24a to S27). Accordingly, the power supply to a load device at a low (or light) load condition from the AC/DC converter 62 can be avoided.

In general, apparatuses such as image forming apparatuses including copiers, printers, or the like may have greater fluctuation (or variation) of power consumption of devices. For example, when a waiting condition for waiting a print instruction is set, power consumption becomes low (i.e., low power consumption), and when a device is activated for printable condition, power consumption becomes high (i.e., high power consumption), and when the apparatus activation is completed and the operation condition is set, power consumption becomes medium (i.e., medium power consumption). Such apparatuses are generally in a low (or light) load condition such as waiting condition for a longer time, and the power consumption ratio at the low (or light) load condition with respect to the total power consumption becomes high. Accordingly, by avoiding the power supply from the AC/DC converter 62 to a load device at a low (or light) load condition, which may be conducted at a lower AC/DC conversion efficiency, the power consumption of apparatus as a whole can be reduced greatly.

Specifically, when the AC/DC converter 62 charges the auxiliary power source 67, the AC/DC conversion efficiency can be set high if the output current value (i.e., current value charging to the auxiliary power source 67) of AC/DC converter 62 is set near a normal rating load of the AC/DC converter 62.

In general, apparatuses such as image forming apparatuses including copiers, printers, or the like may have greater fluctuation (or variation) of power consumption of devices. For example, when a waiting condition for waiting a print instruction is set, power consumption becomes low (i.e., low power consumption), and when a device is activated for printable condition, power consumption becomes high (i.e., high power consumption), and when the apparatus activation is completed and the operation condition is set, power consumption becomes medium (i.e., medium power consumption). Generally, the normal rating load of AC/DC converter 62 may be set to an output current value at the high power consumption.

In the fourth example embodiment, the auxiliary power source 67 can be used as an auxiliary power source that can output (or discharge) a current when a power consumption becomes high such as when an printing operation is conducted, by which the current value for charging the auxiliary power source 67 can be set closer to a current value of the normal rating load of the AC/DC converter 62. Accordingly, the output current value of AC/DC converter 62 (i.e., current value charging to the auxiliary power source 67) becomes a value near the normal rating load of the AC/DC converter 62, by which the AC/DC conversion efficiency when the AC/DC converter 62 charges the auxiliary power source 67 can be set high.

In the fourth example embodiment, the non-volatile RAM 54 of the power source controller 50 (FIG. 4) may be set with an area storing remaining time table (or remaining time data group), in which remaining time data of the auxiliary power source 67 can be stored before shipping the image forming apparatus 1 (see FIGS. 1 and 2) of the fourth example embodiment. The remaining time data of the auxiliary power source 67 means a given remaining time that the auxiliary power source 67 can supply power to a DC-using load device, and such given remaining time may correspond to the charge voltage of capacitor 69. The given remaining time may be set slimly shorter than a time period that the power supply becomes zero (or power supply becomes impossible).

Referring again to FIG. 11 of the fourth example embodiment, when the charge voltage of capacitor 69 becomes less than a given value such as the charge starting threshold Vcw, the CPU 51 reads a remaining time Tr, corresponding to the charge voltage of capacitor 69, from the non-volatile RAM 54 (steps S24a and S24b). If the remaining time Tr becomes too small such as zero or substantially equal to zero (steps S24c), the AC/DC converter 62 starts to output a voltage to charge the capacitor 69 (steps S25 and S27). If the remaining time Tr can be obtained by accessing the memory as such, the remaining time Tr can be obtained without a special computation function or the like. Other configurations and functions of the fourth example embodiment are same as the first example embodiment.

Fifth Example Embodiment

In the fourth example embodiment, the first and second load current detection circuits 63 and 65 are used as a load detector to detect high/low level of direct current output from the AC/DC converter 62 to the DC load devices 81 and 82. However, in a fifth example embodiment, the power supply to power source circuits 83 and 60 may be controlled in view of switching between the operation mode and energy save mode. The power source circuit of the fifth example embodiment is same as the power source circuit shown in FIG. 7.

Figure 12:
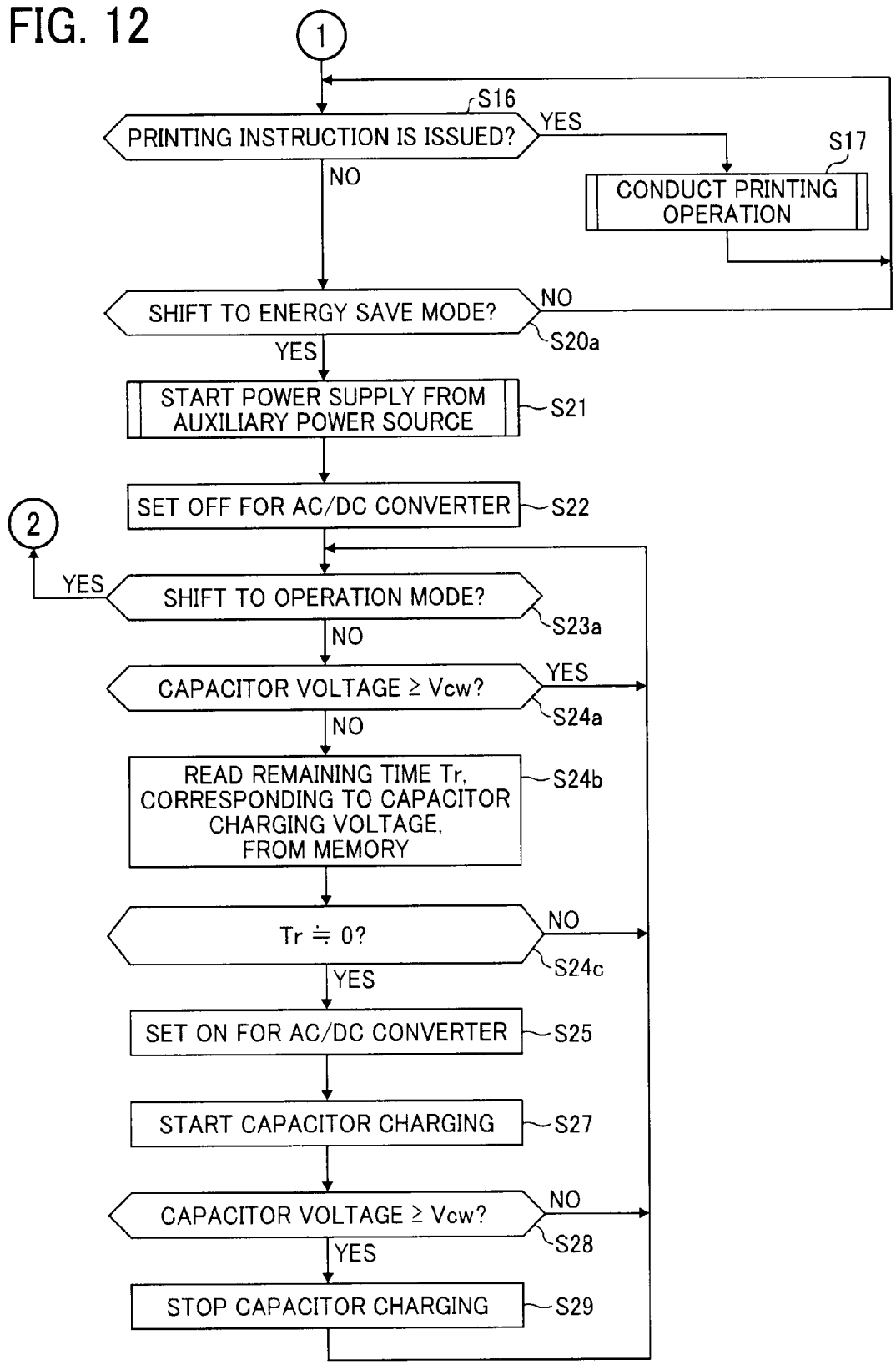
FIG. 12 shows another continuation of the flowchart shown in FIG. 5 according to a fifth example embodiment conductible by a CPU.

The power supply control of the second example embodiment shown in FIG. 8 is changed for the fifth example embodiment as similar to the change for the fourth example embodiment as shown in FIG. 12. The CPU 51 of fifth example embodiment conducts the power supply control shown in FIG. 12. Other configurations and functions of the fifth example embodiment are same as the second example embodiment.

Sixth Example Embodiment

Figure 13:
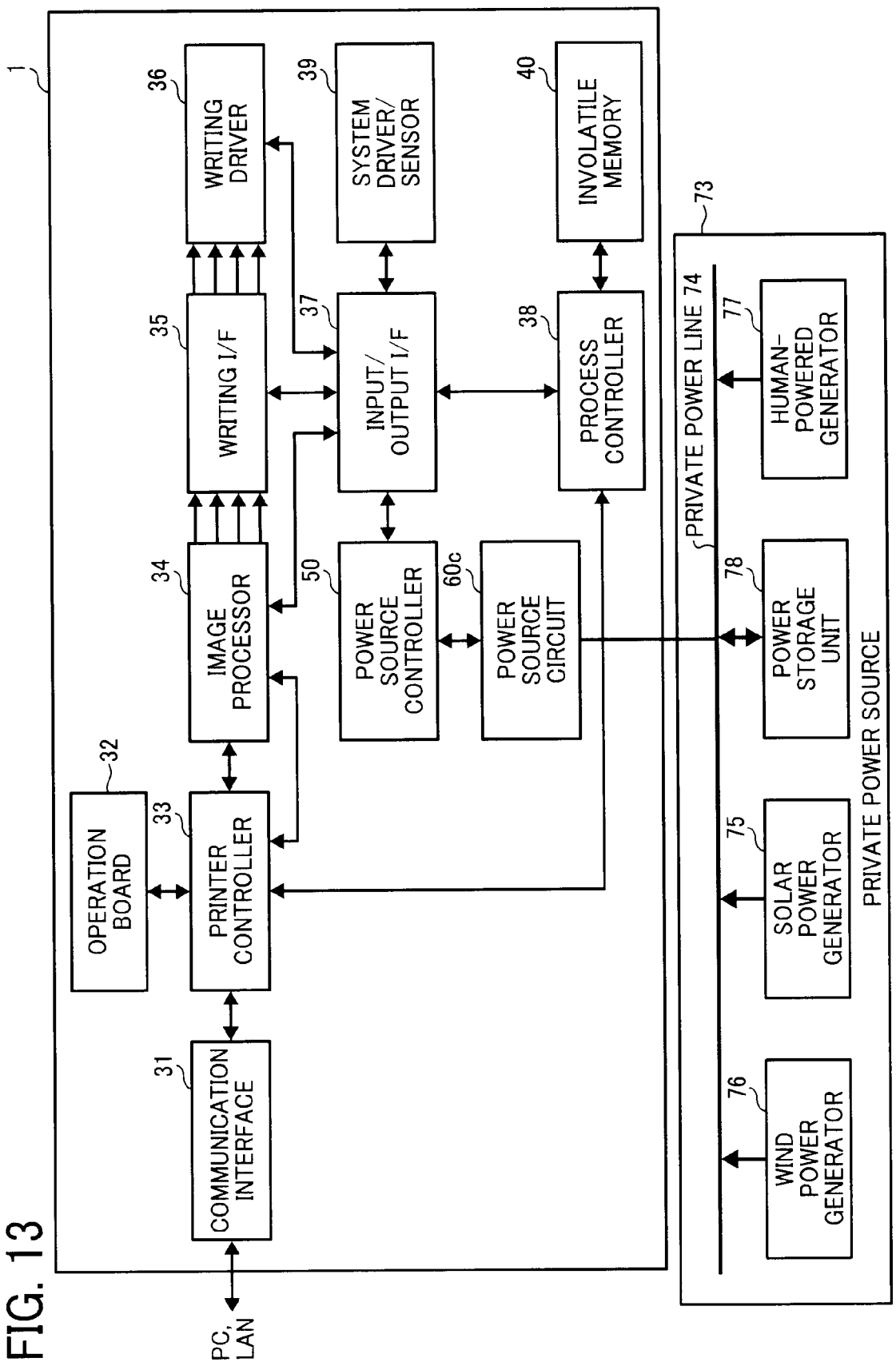
FIG. 13 shows a block diagram of electrical system for an image forming apparatus according to a sixth example embodiment.

FIG. 13 shows a schematic electrical system configuration for the image forming apparatus 1 according to a sixth example embodiment, in which a user of the image forming apparatus 1 employs a user environment having a private power line 74. The private power line 74 may be connected to a wind power generator 76, a solar power generator 75, a human-powered generator 77, and a power storage unit 78, for example. Typically, the solar power generator 75 may be, for example, a solar cell. The human-powered generator 77 may be, for example, a muscle-training machine connected to a generator, in which a user runs the muscle-training machine to rotate the generator to generate electricity while the user can train his or her muscle. The power storage unit 78 may include a storage battery, a storage capacitor, and a charge/discharge controller, in which generated power (or direct current power) is stored in the storage capacitor, and the storage capacitor charges the power storage unit 78, and then the power storage unit 78 supplies power to the private power line 74.

Figure 14:
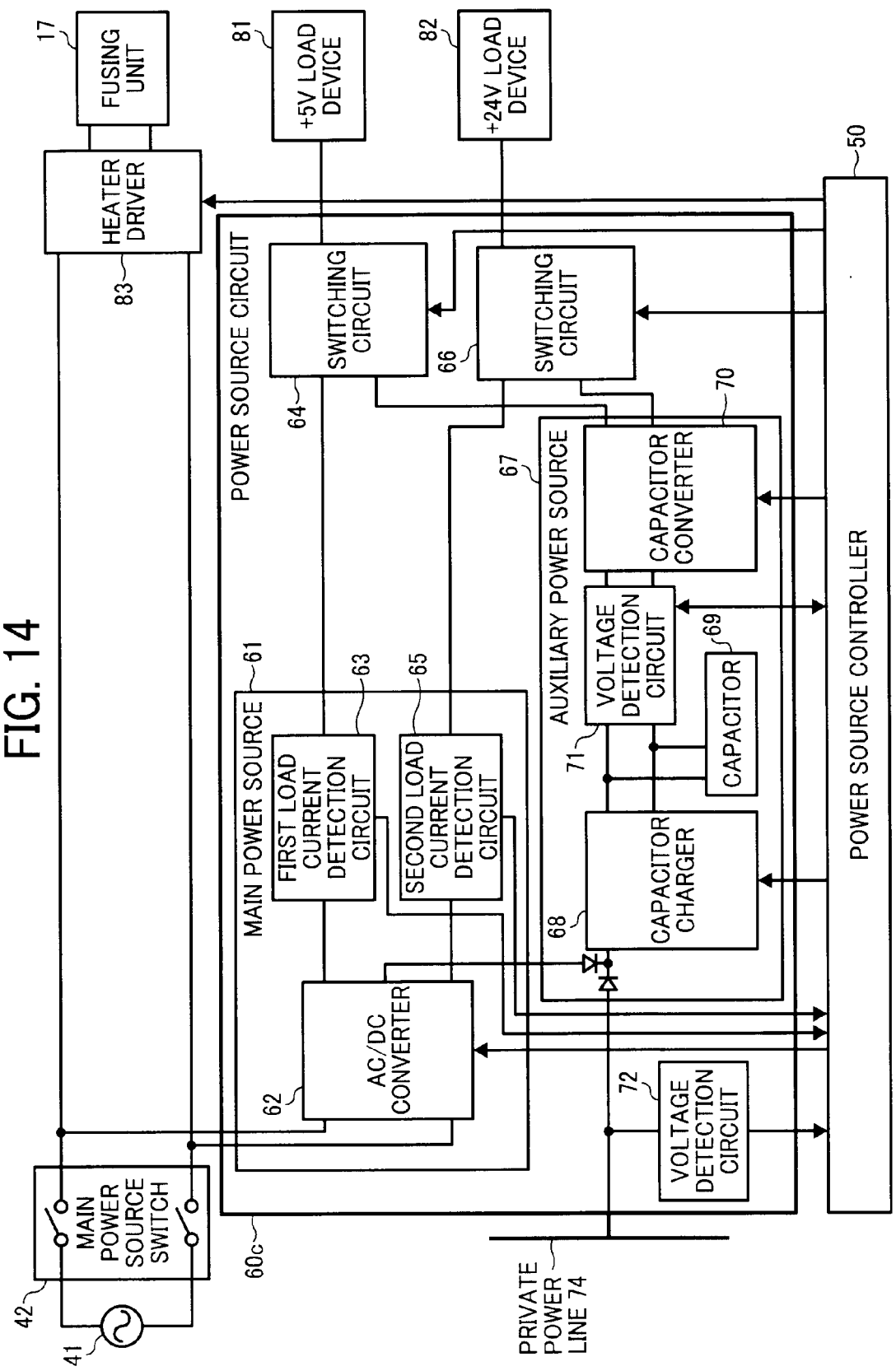
FIG. 14 shows one example block diagram of a power source circuit used for the configuration shown in FIG. 13.

FIG. 14 shows a schematic configuration of a power source circuit 60c of the sixth example embodiment. The private power line 74 and/or the AC/DC converter 62 can supply power to the capacitor charger 68 of the auxiliary power source 67, which can be used as power for charging the capacitor 69. A voltage detection circuit 72 detects direct current voltage of the private power line 74, and the CPU 51 of power source controller 50 (FIG. 4) reads the detected voltage.

Figure 15:
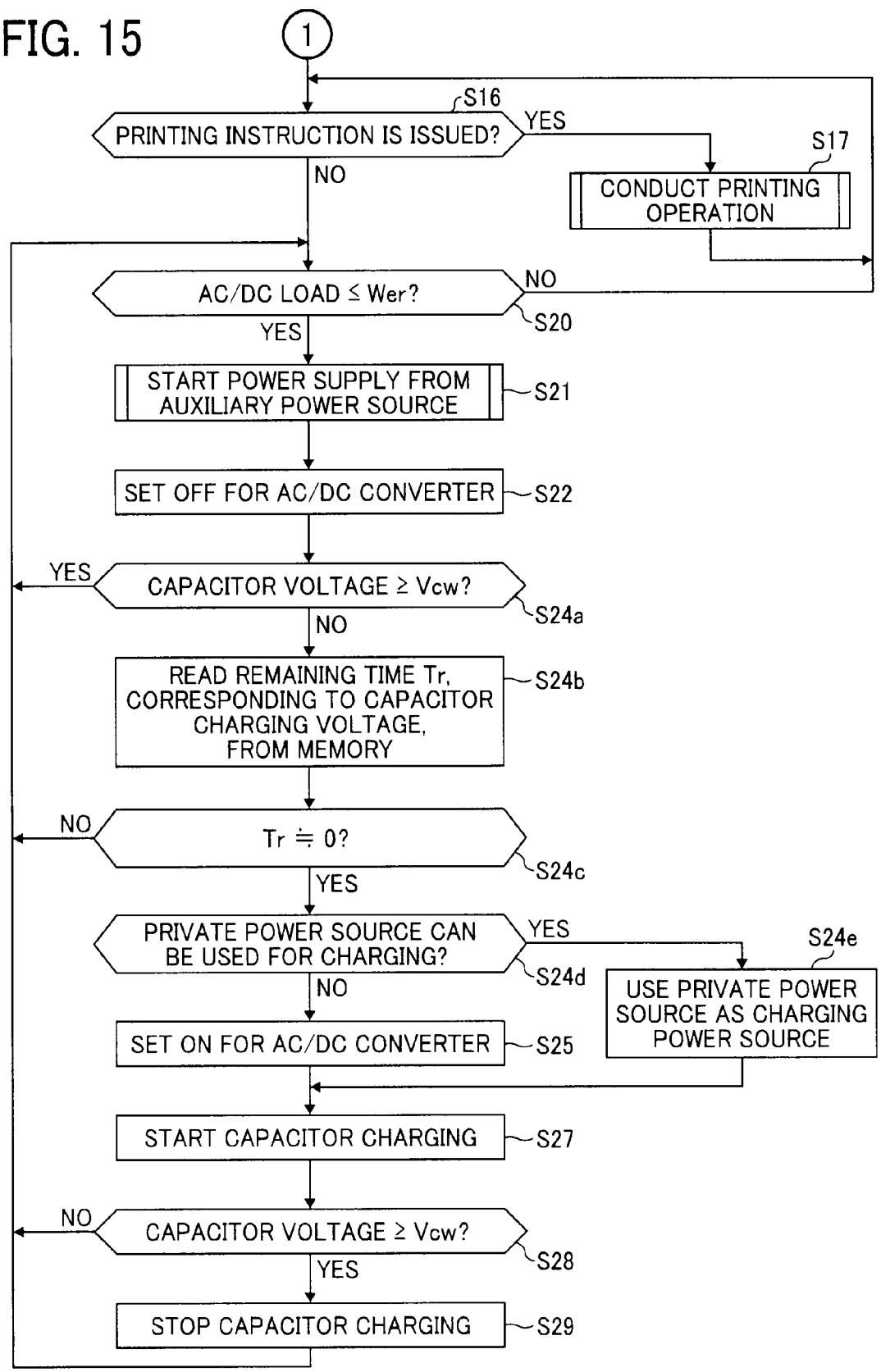
FIG. 15 shows another continuation of the flowchart shown in FIG. 5 according to a sixth example embodiment conductible by a CPU.

FIG. 15 shows the second half of the power supply control conductible by the CPU 51 of the sixth example embodiment. The power supply control of the sixth example embodiment changes a part of the power supply control of the fourth example embodiment shown in FIG. 11 to use power supply from the private power line 74 (steps S24d and S24e). Specifically, when the charge voltage of capacitor 69 decreases to a given low level and the charging is required (step S24b and S24c), the CPU 51 of the sixth example embodiment checks the detection voltage of the voltage detection circuit 72, that is the voltage of private power line 74 (step S24d). If the voltage of the private power line 74 is enough for charging the capacitor 69 (step S24d), the charging from the private power line 74 to the auxiliary power source 67 (or the capacitor 69) starts (steps S24e and S27). However, if the voltage of the private power line 74 is not enough, the AC/DC converter 62 starts to output (step S25) so that the AC/DC converter 62 charges the auxiliary power source 67 (step S27). Other configurations and functions of the sixth example embodiment are same as the fourth example embodiment.

By charging the auxiliary power source 67 from the private power source 73, power at a low (or light) load condition can be obtained without AC input, and AC power consumption at the low (or light) load condition can be reduced (or in particular eliminated).

In general, apparatuses such as image forming apparatuses including copiers, printers, or the like may have greater fluctuation (or variation) of power consumption of devices. For example, when a waiting condition for waiting a print instruction is set, power consumption becomes low (i.e., low power consumption), and when a device is activated for printable condition, power consumption becomes high (i.e., high power consumption), and when the apparatus activation is completed and the operation condition is set, power consumption becomes medium (i.e., medium power consumption). Such apparatuses are generally in a low (or light) load condition such as waiting condition for a longer time, and the power consumption ratio at the low (or light) load condition with respect to the total power consumption becomes high. Accordingly, by avoiding the power supply from the AC/DC converter 62 to a load device at a low (or light) load condition, which may be conducted at a lower AC/DC conversion efficiency, the power consumption of apparatus as a whole can be reduced greatly.

In general, apparatuses such as image forming apparatuses including copiers, printers, or the like may have greater fluctuation (or variation) of power consumption of devices. For example, at a print instruction waiting condition, a low power consumption is set, and when a device is activated for printable condition, a high power consumption is set, and when the activation is completed and the operation condition is set, a medium power consumption is set. The power consumption amount at a low (or light) load condition of such apparatuses, having greater power consumption fluctuation (or variation), is generally several watts (W), or may be 1 watt or less, and such power consumption amount can be effectively supplied using solar cells available at the market, for example. Accordingly, the private power source 73 can be configured with only by solar cells.

Seventh Example Embodiment

In the sixth example embodiment, the first and second load current detection circuits 63 and 65 are be used as a load detector to detect high/low level of direct current output from the AC/DC converter 62 to the direct current load devices 81 and 82. However, in a seventh example embodiment, as similar to the second example embodiment (FIG. 8), the power supply of the power source circuits 83 and 60 are controlled in response to switching between the operation mode and energy save mode.

Figure 16:
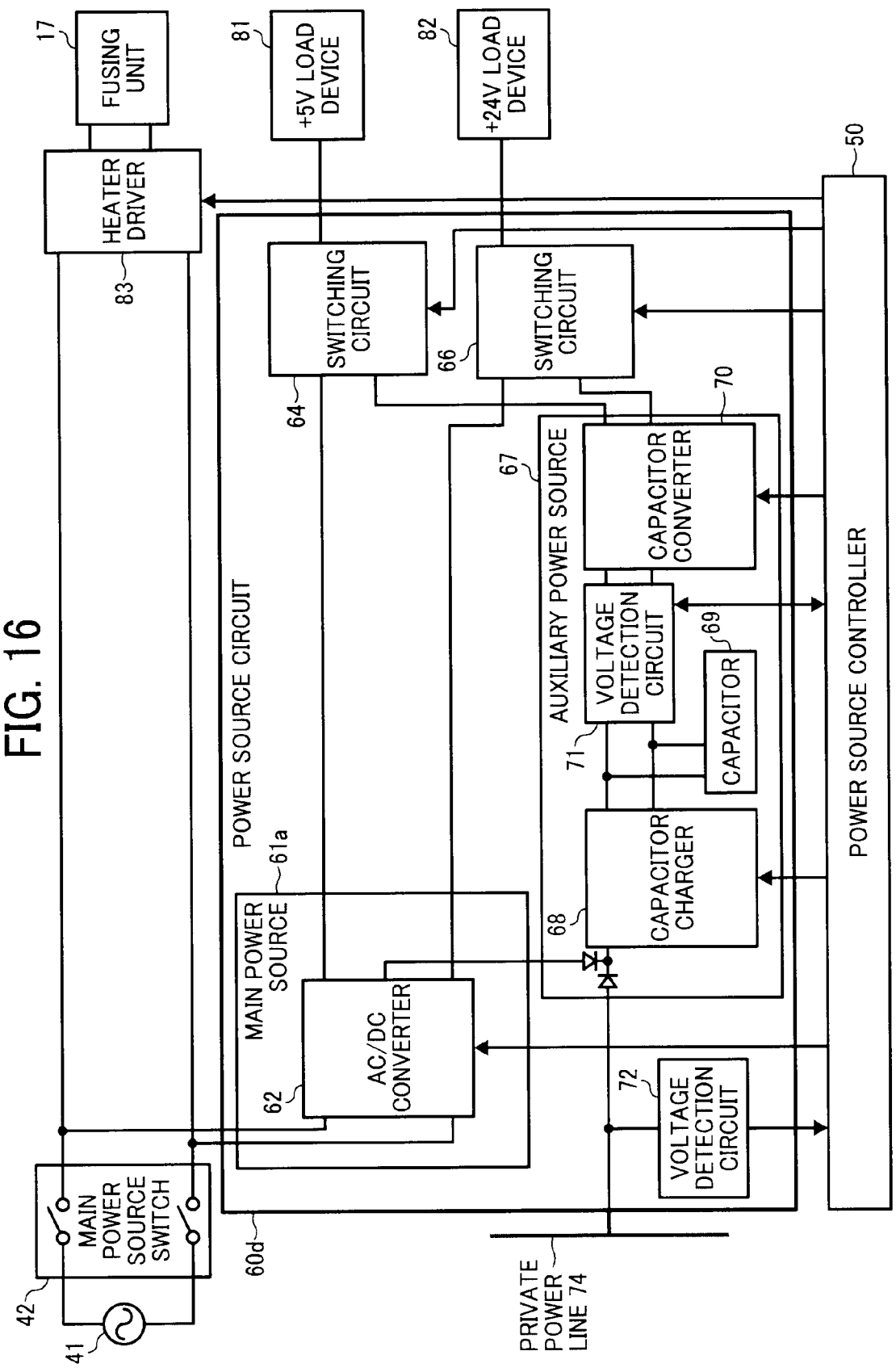
FIG. 16 shows one example block diagram of a power source circuit according to a seventh example embodiment.

FIG. 16 shows a schematic configuration of a power source circuit 60d of the seventh example embodiment. The power source circuit 60d can be prepared by changing a configuration of the power source circuit 60a of the second example embodiment shown in FIG. 7 with providing the private power line 74 of FIGS. 13 and 14 so that power of the private power line 74 can be used.

Figure 17:
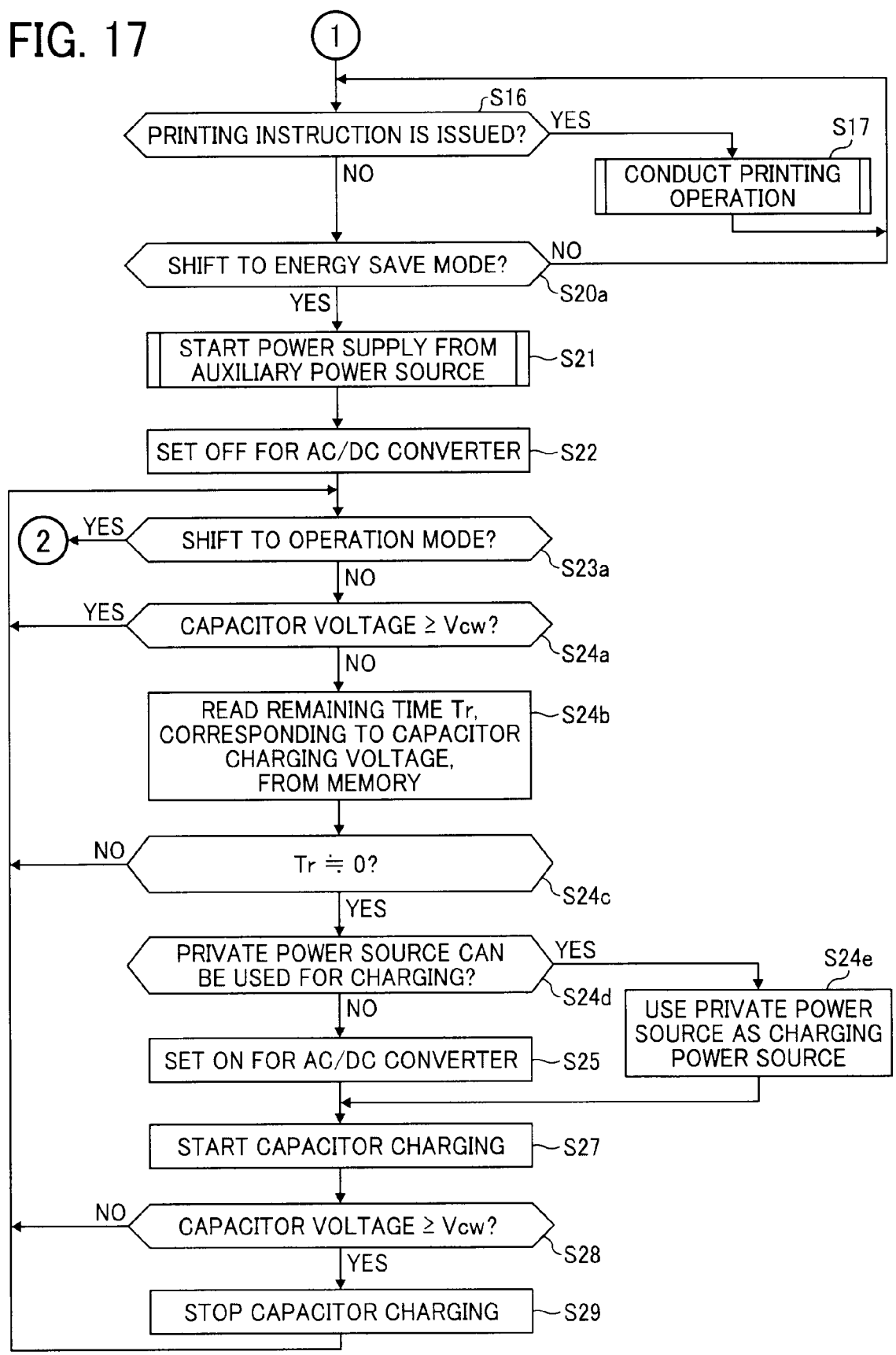
FIG. 17 shows another continuation of the flowchart shown in FIG. 5 according to the seventh example embodiment conductible by a CPU.

FIG. 17 shows the second half of the power supply control conductible by the CPU 51 of the seventh example embodiment. The CPU 51 of the seventh example embodiment conducts the power supply control of the fifth example embodiment shown in FIG. 12 using power supply from the private power line 74 as similar to the sixth example embodiment (steps S24d and S24e). Other configurations and functions of the seventh example embodiment are same as the second example embodiment.

In the above described power source unit, the AC/DC converter 62 converts alternating current to direct current output, the auxiliary power source 67 is capable of storing electric power, and the load detectors 63 and 65 detect high/low level of direct current output from the AC/DC converter 62 to the DC-using load devices 81 and 82.

When load of apparatus such as load devices 17, 81, and 82 exceeds a power limit of the alternating current power source, a direct current output of the AC/DC converter 62 is shutdown (or disconnected), instead the auxiliary power source 67 supplies power to the DC-using load devices 81 and 82 (S4 in FIG. 5; fusing reload operation period I and operation period IIa in FIG. 18).

In case of within the power limit of the alternating current power source, during a period that the load detectors 63 and 65 detect "high" for the DC-using load devices 81 and 82, the AC/DC converter 62 supplies power to the DC-using load devices 81 and 82 (step S15, operation period IIb, standby period III), and during a period that the load detectors 63 and 65 detect "low" for the DC-using load devices 81 and 82, the auxiliary power source 67 supplies power to the DC-using load devices 81 and 82, and the AC/DC converter 62 is shutdown (or disconnected) (step S20 to S22). The CPU 51 of power supply controller controls such processing.

When a total load of load devices 17, 81, and 82 or the like exceeds the power limit of alternating current power source (e.g., fusing reload operation period I, operation period IIa), the CPU 51 of power supply controller shutdowns a direct current output of the AC/DC converter 62, and instead uses the auxiliary power source 67 to supply power to the DC-using load devices 81 and 82, by which a load amount for alternating current can be within the power limit of alternating current power source. In such a configuration, a power output can be set higher than a power limit of alternating current power source for a power supply amount to be supplied by the auxiliary power source 67.

In case of within the power limit of the alternating current power source, during a period that the load detectors 63 and 65 detect "high" for the direct current DC load devices, the AC/DC converter 62 supplies power to the direct current DC load devices 81 and 82 (operation period IIb, standby period III). At the high load output, the output efficiency of AC/DC converter 62 becomes high, by which the power loss of power source unit becomes lower.

Further, during a period that the load detectors 63 and 65 detect "low" for the direct current DC load devices, the auxiliary power source 67 supplies power to the direct current DC load devices, and the AC/DC converter 62 is shutdown (or disconnected) (energy saving period IV), by which the power loss of power source unit becomes lower. As such, power loss of the AC/DC converter 62 can be reduced, and power loss of the auxiliary power source 67 due to charging and discharging can be set smaller than power loss of the AC/DC converter 62 at a low power output.

When the load detectors 63 and 65 detect "high" for direct current output, and a power supply amount from the alternating current power source to an alternating current load device becomes lower, and then the remaining power amount of auxiliary power source 67 decreases to a given low level, the CPU 51 of power supply controller instructs a charging of the auxiliary power source 67 (S23 to S27 of FIG. 6). Because the power supply from the alternating current power source to then alternating current load device becomes lower, the auxiliary power source 67 can be charged within the power limit of alternating current power source.

In the above described power source unit, the AC/DC converter 62 converts alternating current to direct current output, the auxiliary power source 67 is capable of storing electric power, and the load detectors 63 and 65 detect high/low level of direct current output from the AC/DC converter 62 to DC-using load devices 81 and 82.

A power supply mode designation unit such as the power source controller 50 may designate an operation mode and an energy save mode. In the operation mode, a direct current output of the AC/DC converter 62 to the DC-using load devices 81 and 82 is set high, and in the energy save mode, power is supplied only to a DC-using load device 81 such as a lower load device.

When load of apparatus such as load devices 17, 81, and 82 exceeds a power limit of the alternating current power source, a direct current output of the AC/DC converter 62 is shutdown (or disconnected), instead the auxiliary power source 67 supplies power to the DC-using load devices 81 and 82 (S4 in FIG. 5; fusing reload operation period I and operation period IIa in FIG. 18).

In case of within the power limit of the alternating current power source, when the operation mode is designated by the power supply mode designation unit such as power source controller 50, the AC/DC converter 62 supplies power to the DC-using load devices 81 and 82 (step S15, operation period IIb, standby period III). When the energy save mode is designated by the power supply mode designation unit such as power source controller 50, the auxiliary power source 67 supplies power to the DC-using load devices 81 and 82 and the AC/DC converter 62 is shutdown (or disconnected) (S20a to S22 of FIG. 8, energy saving period IV). The CPU 51 of power supply controller such as controls such processing.

When a total load of load devices 17, 81, and 82 or the like exceeds the power limit of alternating current power source (e.g., fusing reload operation period I, operation period IIa), the CPU 51 of power supply controller shutdowns a direct current output of the AC/DC converter 62, and instead uses the auxiliary power source 67 to supply power to the DC-using load devices 81 and 82, by which a load amount for alternating current can be within the power limit of alternating current power source. In such a configuration, a power output can be set higher than a power limit of alternating current power source for a power supply amount to be supplied by the auxiliary power source 67.

During the operation mode, the AC/DC converter 62 supplies power to the direct current DC load devices 81 and 82 (operation period IIb, standby period III). At the high load output, the output efficiency of AC/DC converter 62 becomes high, by which the power loss of power source unit becomes lower.

Further, during the energy save mode, the auxiliary power source 67 supplies power to the direct current load devices, and the AC/DC converter 62 is shutdown (or disconnected) (energy saving period IV), by which the power loss of power source unit becomes lower. As such, power loss of the AC/DC converter 62 can be reduced, and power loss of the auxiliary power source 67 due to charging and discharging can be set smaller than power loss of the AC/DC converter 62 at a low power output.

In the above described power source unit, during the operation mode, when the power supply from the alternating current power source to an alternating current load device becomes lower, and then the remaining power amount of auxiliary power source 67 becomes lower, the CPU 51 of the power supply controller instructs a charging of the auxiliary power source 67 (S14 of FIG. 5, S16 to S19 of FIG. 8). Because the power supply from the alternating current power source to the alternating current load device becomes lower, the auxiliary power source 67 can be charged within the power limit of alternating current power source.

In the above described power source unit, the auxiliary power source 67 can be charged by the AC/DC converter 62 (S15 of FIG. 5 to S19 of FIGS. 6 and 8, S25 to S27 of FIGS. 6 and 8).

In the above described configuration, when the AC/DC converter 62 charges the auxiliary power source 67, even if the AC/DC converter 62 supplies a lower power to the DC-using load device, the AC/DC converter 62 outputs a charging power to the auxiliary power source 67, by which a direct current output of the AC/DC converter 62 becomes higher, and the output efficiency becomes higher. Accordingly, the power loss of power source unit becomes lower.

When the auxiliary power source 67 supplies power to the DC-using load device within the power limit of alternating current power source, and the AC/DC converter 62 is shutdown (or disconnected) (energy saving period IV), and then the remaining power amount of the auxiliary power source 67 decreases to a given low level, the CPU 51 of power supply controller instructs the AC/DC converter 62 to supply power to the DC-using load device 81 and to charge the auxiliary power source 67 (S15 of FIG. 5, S24 to S29 of FIGS. 6 and 8).

In such a case, a power supply of the AC/DC converter 62 to the DC-using load device 81 is small, but the AC/DC converter 62 outputs a higher charging power to the auxiliary power source 67, by which output efficiency of the AC/DC converter 62 becomes high. Specifically, the AC/DC converter 62 may not supply power at a low (or light) load condition, which becomes a low output efficiency, and thereby the power loss of power source unit becomes lower.

The auxiliary power source 67 can be charged by the alternating current of alternating current power source (FIG. 9).

When the auxiliary power source 67 supplies power to the DC-using load device within the power limit of alternating current power source, and the AC/DC converter 62 is shutdown (or disconnected) (energy saving period IV), and then the remaining power amount of the auxiliary power source 67 decreases to a given low level, the CPU 51 of the power supply controller drives the AC/DC converter 62 at a lower frequency to supply power to the DC-using load device 81 and to charge the auxiliary power source 67 using the AC/DC converter 62 (S21 to S27 of FIG. 10).

In such a case, a power supply of the AC/DC converter 62 to the DC-using load device 81 is small, but the AC/DC converter 62 is driven at a lower frequency, by which output efficiency of the AC/DC converter 62 becomes high, and the power loss of power source unit becomes lower.

The auxiliary power source 67 can be charged by the private power source 73 (FIGS. 13, 14, and 16). If the private power source 73 can be effectively used, the AC input at low (or light) load condition can be reduced (in particular eliminated), by which power consumption of alternating current can be reduced.

When the auxiliary power source 67 supplies power to the DC-using load device within the power limit of alternating current power source, and then the remaining power amount of the auxiliary power source 67 decreases to a given low level, the CPU 51 of the power supply controller continues power supply from the auxiliary power source 67 to the DC-using load device and instructs a charging of the auxiliary power source 67 by the AC/DC converter 62 (steps S24a, S24b, S24c, S25, S27 of FIGS. 11 and 12)

In such a case, a power supply of the AC/DC converter 62 to the DC-using load device 81 is small, but the AC/DC converter 62 outputs a higher charging power to the auxiliary power source 67, by which output efficiency of the AC/DC converter 62 becomes high. Specifically, the AC/DC converter 62 may not supply power at a low (or light) load condition, which becomes a low output efficiency, and thereby the power loss of power source unit becomes lower.

When the auxiliary power source 67 supplies power to the DC-using load device within the power limit of alternating current power source, the CPU 51 of the power supply controller computes the remaining time Tr (step S24b) corresponding to a time that the auxiliary power source 67 can still supply power based on the remaining power amount of the auxiliary power source 67, and the CPU 51 of the power supply controller instructs a start of charging to the auxiliary power source 67 using the AC/DC converter 62 (steps S24c and S25) before the remaining time Tr becomes zero. As such, before the power supply to the DC-using load device becomes difficult due to a lower remaining power amount of auxiliary power source 67, the AC/DC converter 62 can start a charging to the auxiliary power source 67 based on a prediction of remaining power amount of the auxiliary power source 67, by which a lower efficiency operation of the AC/DC converter 62 (such as AC input) can be prevented, by which power consumption can be reduced.

The remaining time Tr can be read out from a memory storing data of remaining time Tr matched to remaining power amount of the auxiliary power source 67, by which remaining time Tr corresponding to a remaining power amount of the auxiliary power source 67, which is used for supplying power, can be read out (step S24b). The remaining power amount of auxiliary power source 67 can be predicted and computed easily using a voltage value of auxiliary power source 67 and by accessing such memory, by which the remaining time Tr can be obtained and predicted without a special computation function or the like.

A charging from the AC/DC converter 62 to the auxiliary power source 67 can be stopped when a charge amount of the auxiliary power source 67 becomes a predetermined value (steps S28 and S29). Because the charging from the AC/DC converter 62 to the auxiliary power source 67 can be stopped when the charge amount of the auxiliary power source 67 becomes the predetermined value, a stop time of power supply by the AC/DC converter 62 can be extended, by which power consumption can be reduced. Further, by avoiding an excessive charging, a cell life can be extended.

When the AC/DC converter 62 charges the auxiliary power source 67, the AC/DC converter 62 may conduct a charging at a higher or highest conversion efficiency. When the AC/DC converter 62 is used at a high AC/DC conversion efficiency, power consumption can be reduced.

The auxiliary power source 67 may be charged by the private power source 73 when the private power source 73 has enough power (i.e., the private power source 73 can be used for power supply), and the auxiliary power source 67 may be charged by the AC/DC converter 62 when the private power source 73 has not enough power (i.e., the private power source 73 cannot be used for power supply) (FIGS. 13 and 14, S24d and S24e of FIGS. 15 and 17). When the private power source 73 can be used for power supply at a low (or light) load condition, the private power source 73 can be used for charging the auxiliary power source 67, in which the AC input at low (or light) load condition can be reduced (in particular eliminated), by which power consumption of alternating current can be reduced.

The above described power source unit can be applied for the image forming apparatus (FIGS. 1 and 2), which includes the photoconductor 5 for forming an electrostatic latent image, the image forming units (see 2 to 11 of FIG. 1) to develop the electrostatic latent image as a toner image and transfer the toner image directly to a sheet or indirectly using the transfer belt 3, the fusing unit 17 having the fusing heater to fuse the toner image on the sheet, and the heater driver 83 to control an alternating current input from an alternating current power source to run electricity for the fusing heater.

As above described example embodiments, a power source unit having an AC/DC converter can be used for outputting higher voltage and enhancing power output efficiency at high level.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A power source unit comprising:
   an AC/DC (alternating current/direct current) converter to convert alternating current to direct current output;
   an auxiliary power source capable of storing electric power;
   a load detector to detect a high/low level of direct current output to a DC-using load device from the AC/DC converter; and
   a power supply controller to control power supply according to a required load,
   wherein, when load to be required exceeds alternating current power source limits, the power supply controller shuts down output of direct current from the AC/DC converter, and instead uses the auxiliary power source to supply power to the DC-using load device, and
   wherein, when the load to be required is within alternating current power source limits, the power supply controller uses the AC/DC converter to supply power to the DC-using load device while the load detector detects high voltage for the DC-using load device, and
   the power supply controller uses the auxiliary power source to supply power to the DC-using load device and shuts down the AC/DC converter while the load detector detects low voltage for the DC-using load device.

2. The power source unit of claim 1, wherein, when the load detector detects a high level for the direct current output and a power supply amount from the alternating current power source to an alternating current load device is low, the power supply controller causes the auxiliary power source to be charged when a remaining power amount of the auxiliary power source is low.

3. The power source unit of claim 2, wherein the auxiliary power source is charged by using the AC/DC converter.

4. The power source unit of claim 3, wherein charging of the auxiliary power source by the AC/DC converter is stopped when a charge amount of the auxiliary power source reaches a predetermined value.

5. The power source unit of claim 3, wherein charging of the auxiliary power source using the AC/DC converter is conducted by operating the AC/DC converter at highest conversion efficiency.

6. The power source unit of claim 2, wherein, when the auxiliary power source supplies power to the DC-using load device within alternating current power source limits and the AC/DC converter is shut down, and a remaining power amount of the auxiliary power source is low, the power supply controller uses the AC/DC converter to supply power to the DC-using load device and to charge the auxiliary power source.

7. The power source unit of claim 6, wherein, when the auxiliary power source supplies power to the DC-using load device within alternating current power limits and the AC/DC converter is shut down and a remaining power amount of the auxiliary power source is low, the power supply controller drives the AC/DC converter at a lower frequency to supply power to the DC-using load device and to charge the auxiliary power source using alternating current from the alternating current power source.

8. The power source unit of claim 2 wherein the auxiliary power source is charged by using alternating current from the alternating current power source.

9. The power source unit of claim 2, wherein the auxiliary power source is charged using a private power source.

10. The power source unit of claim 9, wherein the auxiliary power source is charged by a private power source when power of the private power source is available, and the auxiliary power source is charged by the AC/DC converter when power of the private power source is not available.

11. The power source unit of claim 2, wherein, when the auxiliary power source supplies power to the DC-using load device within alternating current power limits, and a remaining power amount of the auxiliary power source is low, the power supply controller continues to supply power to the DC-using load device from the auxiliary power source and charges the auxiliary power source using the AC/DC converter.

12. The power source unit of claim 11, wherein, when the auxiliary power source supplies power to the DC-using load device within alternating current power limits, the power supply controller computes a remaining time that the auxiliary power source can still supply power based on a remaining power amount of the auxiliary power source, and starts charging the auxiliary power source using the AC/DC converter before the remaining time becomes zero.

13. The power source unit of claim 12, further comprising a memory storing the remaining time of the auxiliary power source corresponding to the remaining power amount of the auxiliary power source,
wherein the remaining time is obtained by reading out a remaining time corresponding to the remaining power amount of the auxiliary power source being used for supplying power.

14. An image forming apparatus comprising:
an image forming unit to form an electrostatic latent image on a photoconductor, to develop the electrostatic latent image as a toner image, and to directly transfer the toner image to a sheet or indirectly transfer the toner image to a sheet using an intermediate transfer member;
a fusing unit having a fusing heater to fuse the toner image on the sheet;
a heater driver to control inputted alternating current and to supply the alternating current to the fusing heater; and
the power source unit of claim 1.

15. A power source unit comprising:
an AC/DC (alternating current/direct current) converter to convert alternating current to direct current output;
an auxiliary power source capable of storing electric power;
a power supply mode designation unit to designate one of an operation mode and an energy save mode, the operation mode designating supply of high direct current output to a DC-using load device from the AC/DC converter and the energy save mode designating supply of power to a specific smaller load DC-using load device; and
a power supply controller to control power supply according to a required load and a designated mode,
wherein, when the power supply mode designation unit designates the operation mode, and a load to be required exceeds alternating current power source limits, the power supply controller shuts downs output of direct current from the AC/DC converter, and instead uses the auxiliary power source to supply power to the DC-using load device,
wherein, when a load to be required is within alternating current power source limits,
the power supply controller uses the AC/DC converter to supply power to the DC-using load device while the operation mode is set, and uses the auxiliary power source to supply power to the DC-using load device and shuts down the AC/DC converter while the energy save mode is designated by the power supply mode designation unit.

16. The power source unit of claim 15, wherein, in the operation mode, when a power supply amount from the alternating current power source to an alternating current load device is low, the power supply controller causes the auxiliary power source to be charged when a remaining power amount of the auxiliary power source is low.

* * * * *